United States Patent
Gilliam et al.

(10) Patent No.: US 8,834,688 B2
(45) Date of Patent: Sep. 16, 2014

(54) LOW-VOLTAGE ALKALINE PRODUCTION USING HYDROGEN AND ELECTROCATALYTIC ELECTRODES

(75) Inventors: Ryan J. Gilliam, San Jose, CA (US); Valentin Decker, San Jose, CA (US); Bryan Boggs, Campbell, CA (US); Nikhil Jalani, Campbell, CA (US); Thomas A. Albrecht, Mountain View, CA (US); Matt Smith, Campbell, CA (US)

(73) Assignee: Calera Corporation, Los Gatos, CA (US)

( * ) Notice: Subject to any disclaimer, the term of this patent is extended or adjusted under 35 U.S.C. 154(b) by 560 days.

(21) Appl. No.: 12/991,898

(22) PCT Filed: Feb. 10, 2010

(86) PCT No.: PCT/US2010/023783
§ 371 (c)(1),
(2), (4) Date: Dec. 15, 2010

(87) PCT Pub. No.: WO2010/093716
PCT Pub. Date: Aug. 19, 2010

(65) Prior Publication Data
US 2011/0083968 A1 Apr. 14, 2011

Related U.S. Application Data

(60) Provisional application No. 61/151,472, filed on Feb. 10, 2009, provisional application No. 61/151,484, filed on Feb. 10, 2009, provisional application No. 61/151,481, filed on Feb. 10, 2009.

(51) Int. Cl.
| | | |
|---|---|---|
| C25B 15/00 | (2006.01) |
| C25B 1/04 | (2006.01) |
| B01D 53/32 | (2006.01) |
| C25B 15/08 | (2006.01) |
| C02F 1/461 | (2006.01) |

(52) U.S. Cl.
CPC .............. C25B 1/04 (2013.01); *Y02E 60/366* (2013.01); *B01D 2257/504* (2013.01); *C02F 1/4618* (2013.01); *B01D 53/326* (2013.01); *C25B 15/08* (2013.01)
USPC .............. 204/290.01; 204/290.14; 204/242; 204/277

(58) Field of Classification Search
USPC ................. 204/290.01–290.14, 242, 277
See application file for complete search history.

(56) References Cited

U.S. PATENT DOCUMENTS

| | | |
|---|---|---|
| 1,169,766 A | 2/1916 | Brassert |
| 1,172,930 A | 2/1916 | Brassert et al. |

(Continued)

FOREIGN PATENT DOCUMENTS

| | | |
|---|---|---|
| AU | 2001213118 B2 | 12/2001 |
| AU | 2007100157 A4 | 4/2007 |

(Continued)

OTHER PUBLICATIONS

Constantz, B. (2009) "The Risk of Implementing New Regulations on Game-Changing Technology: Sequestering CO2 in the Built Environment" AGU, 90(22), Jt. Assem, Suppl., Abstract.

(Continued)

*Primary Examiner* — Arun S Phasge
(74) *Attorney, Agent, or Firm* — Vandana Bansal

(57) ABSTRACT

An alkaline production system comprising an electrochemical unit comprising a hydrogen-oxidizing anode, a cathode compartment comprising a cathode and a hydrogen delivery system configured to deliver hydrogen gas to the anode, wherein the system configured to sequester carbon dioxide with the cathode electrolyte; and methods thereof. In another embodiment, a system comprising a hydrogen-oxidizing anode in communication with a cathode electrolyte comprising bicarbonate ion; and an hydrogen delivery system configured to deliver hydrogen gas to the anode; and methods thereof.

23 Claims, 17 Drawing Sheets

(56) References Cited

U.S. PATENT DOCUMENTS

| | | |
|---|---|---|
| 1,176,747 A | 3/1916 | Ferguson |
| 1,493,579 A | 5/1924 | Walter |
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Seil |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,273,795 A | 2/1942 | Heise et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,474,381 A | 6/1949 | Sladick |
| 2,606,839 A | 8/1952 | Evans |
| 2,650,084 A | 8/1953 | White |
| 2,776,132 A | 1/1957 | Pyzel |
| 2,810,450 A | 10/1957 | Hartmann |
| 2,934,419 A | 4/1960 | Cook |
| 2,967,807 A | 1/1961 | Osborne et al. |
| 3,046,152 A | 7/1962 | Tsuneyoshi |
| 3,067,007 A | 8/1962 | Hatch et al. |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Yang et al. |
| 3,222,267 A | 12/1965 | Tirrell et al. |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,538,036 A | 11/1970 | Frazier et al. |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,907,526 A | 9/1975 | Saleem et al. |
| 3,912,801 A | 10/1975 | Stephens |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,984,523 A | 10/1976 | Schafer et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,040,852 A | 8/1977 | Jones |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,181,580 A | 1/1980 | Kitayama et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,432,175 A | 2/1984 | Smith |
| 4,440,611 A | 4/1984 | Dhar et al. |
| 4,450,009 A | 5/1984 | Childs et al. |
| 4,477,573 A | 10/1984 | Taufen |
| 4,508,545 A | 4/1985 | DeLoach |
| 4,561,945 A * | 12/1985 | Coker et al. ............... 205/510 |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Carr et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,876,097 A | 10/1989 | Autant et al. |
| 4,880,447 A | 11/1989 | Bloch |
| 4,889,633 A | 12/1989 | Pfenninger |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,127,765 A | 7/1992 | Millgard et al. |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,651 A | 1/1994 | Minayoshi et al. |
| 5,275,794 A | 1/1994 | Luna |
| 5,282,935 A | 2/1994 | Cawlfield et al. |
| 5,318,758 A | 6/1994 | Fujii et al. |
| 5,332,564 A | 7/1994 | Chapnerkar et al. |

(56) References Cited

U.S. PATENT DOCUMENTS

| | | |
|---|---|---|
| 5,348,712 A | 9/1994 | Marquis et al. |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |
| 5,439,509 A | 8/1995 | Spink et al. |
| 5,455,013 A | 10/1995 | Shibata et al. |
| 5,470,671 A | 11/1995 | Fletcher et al. |
| 5,520,898 A | 5/1996 | Pinnavaia et al. |
| 5,527,387 A | 6/1996 | Andersen et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,587,083 A | 12/1996 | Twardowski |
| 5,595,641 A | 1/1997 | Traini et al. |
| 5,614,078 A | 3/1997 | Lubin et al. |
| 5,618,392 A | 4/1997 | Furuya |
| 5,624,493 A | 4/1997 | Wagh et al. |
| 5,643,415 A | 7/1997 | Wise et al. |
| 5,676,749 A | 10/1997 | Takagi |
| 5,683,587 A | 11/1997 | Ferrara et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,792,441 A | 8/1998 | Paleologou et al. |
| 5,803,894 A | 9/1998 | Kao et al. |
| 5,833,736 A | 11/1998 | Durham et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,879,948 A | 3/1999 | Van Pelt et al. |
| 5,885,478 A | 3/1999 | Montgomery et al. |
| 5,897,704 A | 4/1999 | Baglin |
| 5,904,829 A | 5/1999 | Foller et al. |
| 5,925,255 A | 7/1999 | Mukhopadhyay |
| 5,958,353 A | 9/1999 | Eyal |
| 5,965,201 A | 10/1999 | Jones, Jr. |
| 5,994,838 A | 11/1999 | Klinedinst et al. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,080,320 A | 6/2000 | von Phul |
| 6,090,197 A | 7/2000 | Vivian et al. |
| 6,129,832 A | 10/2000 | Fuhr et al. |
| 6,139,605 A | 10/2000 | Carnell et al. |
| 6,174,507 B1 | 1/2001 | Wallace et al. |
| 6,180,012 B1 | 1/2001 | Rongved |
| 6,180,074 B1 | 1/2001 | Fourcot et al. |
| 6,186,426 B1 | 2/2001 | Killer |
| 6,190,301 B1 | 2/2001 | Murray et al. |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,221,225 B1 | 4/2001 | Mani |
| 6,228,145 B1 | 5/2001 | Falk-Pedersen et al. |
| 6,235,186 B1 | 5/2001 | Tanaka et al. |
| 6,248,166 B1 | 6/2001 | Solsvik |
| 6,251,255 B1 | 6/2001 | Copping et al. |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,284,208 B1 | 9/2001 | Thomassen |
| 6,293,731 B1 | 9/2001 | Studer |
| 6,309,570 B1 | 10/2001 | Fellabaum |
| 6,331,207 B1 | 12/2001 | Gebhardt |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,824 B1 | 6/2002 | Freeman et al. |
| 6,402,831 B1 | 6/2002 | Sawara et al. |
| 6,416,574 B1 | 7/2002 | Steelhammer et al. |
| 6,428,767 B1 | 8/2002 | Burch et al. |
| 6,444,107 B2 | 9/2002 | Hartel et al. |
| 6,447,437 B1 | 9/2002 | Lee et al. |
| 6,468,074 B1 | 10/2002 | Wu |
| 6,475,460 B1 | 11/2002 | Max |
| 6,495,013 B2 | 12/2002 | Mazur et al. |
| 6,500,319 B2 | 12/2002 | LaConti et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,589,405 B2 * | 7/2003 | Weres et al. ............ 204/290.12 |
| 6,602,630 B1 | 8/2003 | Gopal |
| 6,613,141 B2 | 9/2003 | Key, Jr. |
| 6,620,856 B1 | 9/2003 | Mortimer et al. |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,676,744 B2 | 1/2004 | Merkley et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,881,256 B2 | 4/2005 | Orange et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 6,938,425 B2 | 9/2005 | Simpson et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,147,692 B2 | 12/2006 | Fornai et al. |
| 7,182,851 B2 | 2/2007 | Gomez |
| 7,198,722 B2 | 4/2007 | Hussain |
| 7,255,842 B1 | 8/2007 | Yeh et al. |
| 7,261,912 B2 | 8/2007 | Zeigler |
| 7,264,704 B2 | 9/2007 | Nevosi et al. |
| 7,273,540 B2 | 9/2007 | Sonoda et al. |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,459,134 B2 | 12/2008 | Cadours et al. |
| 7,541,011 B2 | 6/2009 | Hu |
| 7,595,001 B2 | 9/2009 | Arakel et al. |
| 7,597,747 B1 | 10/2009 | Nagel |
| 7,628,847 B2 | 12/2009 | Pope et al. |
| 7,674,443 B1 | 3/2010 | Davis |
| 7,699,909 B2 | 4/2010 | Lackner et al. |
| 7,704,369 B2 | 4/2010 | Olah et al. |
| 7,704,370 B2 | 4/2010 | Coustry et al. |
| 7,727,374 B2 | 6/2010 | Jones |
| 7,735,274 B2 | 6/2010 | Constantz et al. |
| 7,736,430 B2 | 6/2010 | Barron et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |

(56) References Cited

U.S. PATENT DOCUMENTS

| | | |
|---|---|---|
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,842,264 B2 | 11/2010 | Cooper et al. |
| 7,875,163 B2 | 1/2011 | Gilliam et al. |
| 7,875,674 B2 | 1/2011 | Kirkpatrick et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,919,064 B2 | 4/2011 | Kawatra et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,933,511 B2 | 8/2011 | Gilliam et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,105,558 B2 | 1/2012 | Comrie |
| 8,114,214 B2 | 2/2012 | Constantz et al. |
| 8,137,444 B2 | 3/2012 | Farsad et al. |
| 8,431,100 B2 | 4/2013 | Constantz et al. |
| 8,470,275 B2 | 6/2013 | Constantz et al. |
| 8,603,424 B2 | 12/2013 | Constantz et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0146163 A1 | 8/2003 | Sasowsky et al. |
| 2003/0170159 A1 | 9/2003 | Honjo et al. |
| 2003/0188668 A1 | 10/2003 | Bland |
| 2003/0213937 A1 | 11/2003 | Yaniv |
| 2003/0229572 A1 | 12/2003 | Raines et al. |
| 2004/0007476 A1 | 1/2004 | Tennakoon et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0094279 A1 | 5/2004 | Myatt |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1 | 5/2005 | McNulty |
| 2005/0106110 A1 | 5/2005 | Liu |
| 2005/0112044 A1 | 5/2005 | Kuma et al. |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0186562 A1 | 8/2006 | Wright et al. |
| 2006/0189837 A1 | 8/2006 | Forrester |
| 2006/0194086 A1 | 8/2006 | Hsu |
| 2006/0195002 A1 | 8/2006 | Grandjean et al. |
| 2006/0196836 A1 | 9/2006 | Arakel et al. |
| 2006/0245993 A1 | 11/2006 | Magumbe et al. |
| 2006/0249380 A1 | 11/2006 | Gestermann et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0053104 A1 | 3/2008 | Haase et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0241337 A1 | 10/2008 | Durand et al. |
| 2008/0245012 A1 | 10/2008 | Boisvert et al. |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |

(56) References Cited

U.S. PATENT DOCUMENTS

| | | |
|---|---|---|
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081092 A1 | 3/2009 | Yang et al. |
| 2009/0081093 A1 | 3/2009 | Comrie |
| 2009/0081096 A1 | 3/2009 | Pellegrin |
| 2009/0081112 A1 | 3/2009 | Virtanen |
| 2009/0087890 A1 | 4/2009 | Pyle et al. |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0117019 A1 | 5/2009 | Comrie |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2009/0308760 A1 | 12/2009 | Wei et al. |
| 2009/0317488 A1 | 12/2009 | Mehta et al. |
| 2010/0000444 A1 | 1/2010 | Constantz et al. |
| 2010/0024686 A1 | 2/2010 | Constantz et al. |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0258506 A1 | 10/2010 | Berkowitz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0024361 A1 | 2/2011 | Schwartzel et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2011/0290156 A1 | 12/2011 | Constantz et al. |
| 2011/0303551 A1 | 12/2011 | Gilliam et al. |
| 2011/0308964 A1 | 12/2011 | Gilliam et al. |
| 2012/0082839 A1 | 4/2012 | Ha et al. |
| 2012/0111236 A1 | 5/2012 | Constantz et al. |
| 2012/0213688 A1 | 8/2012 | Constantz et al. |
| 2012/0312697 A1 | 12/2012 | Gilliam et al. |
| 2013/0036945 A1 | 2/2013 | Constantz et al. |
| 2013/0243674 A1 | 9/2013 | Constantz et al. |
| 2014/0041553 A1 | 2/2014 | Constantz et al. |

FOREIGN PATENT DOCUMENTS

| | | |
|---|---|---|
| AU | 2007201171 A1 | 10/2007 |
| AU | 2007101174 A4 | 1/2008 |
| AU | 2008256636 B2 | 12/2008 |
| AU | 2008101140 A4 | 1/2009 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |
| CA | 2440325 A1 | 1/2003 |
| CA | 2646462 | 9/2007 |
| CA | 2617325 A1 | 11/2007 |
| CA | 2682952 A1 | 10/2008 |
| CA | 2659447 A1 | 12/2008 |
| CN | 1059173 A | 3/1992 |
| CN | 1185989 | 7/1998 |
| CN | 1369576 A | 9/2002 |
| CN | 1220793 C | 9/2005 |
| CN | 101219330 A | 7/2008 |
| CN | 101240426 A | 8/2008 |
| CN | 101250711 A | 8/2008 |
| CN | 101289200 A | 10/2008 |
| CN | 102335553 A | 2/2012 |
| DE | 2653649 A1 | 6/1978 |
| DE | 3146326 A1 | 6/1983 |
| DE | 3638317 A1 | 6/1987 |
| DE | 19512163 A1 | 10/1995 |
| DE | 19523324 A1 | 3/1996 |
| DE | 19631794 A1 | 8/1997 |
| EP | 0522382 A1 | 1/1993 |
| EP | 0558275 A1 | 9/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 | 5/1975 |
| GB | 2032441 | 5/1980 |
| GB | 2050325 A | 1/1981 |
| GB | 2208163 A | 3/1989 |
| GB | 2210035 A | 6/1989 |
| GB | 2371810 A | 8/2002 |
| JP | 51102357 A1 | 9/1976 |

(56) References Cited

FOREIGN PATENT DOCUMENTS

| | | |
|---|---|---|
| JP | 59100280 | 6/1984 |
| JP | 63-312988 A2 | 12/1988 |
| JP | 03-020491 A2 | 1/1991 |
| JP | 03-170363 A | 7/1991 |
| JP | 04-190829 | 7/1992 |
| JP | 04-317721 A | 11/1992 |
| JP | 7061842 A | 3/1995 |
| JP | 7265688 A | 10/1995 |
| JP | 10287461 A | 10/1998 |
| JP | 10305212 A | 11/1998 |
| JP | 2000226402 A | 8/2000 |
| JP | 03184892 B2 | 7/2001 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-075717 A | 3/2006 |
| JP | 2006-076825 | 3/2006 |
| JP | 2006-076825 A | 3/2006 |
| JP | 2009279530 A | 12/2009 |
| NL | 7607470 A | 1/1978 |
| SU | 1819854 A1 | 6/1993 |
| WO | WO 93/16216 A1 | 8/1993 |
| WO | WO 94/18119 | 8/1994 |
| WO | WO 96/34997 A1 | 11/1996 |
| WO | WO 99/08778 A1 | 2/1999 |
| WO | WO 99/13967 A1 | 3/1999 |
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 02/085788 A1 | 10/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/032797 | 3/2006 |
| WO | WO 2006/034339 A1 | 3/2006 |
| WO | WO 2006/036396 A2 | 4/2006 |
| WO | WO 2006/094968 A1 | 9/2006 |
| WO | WO 2006/099599 A2 | 9/2006 |
| WO | WO 2006/113997 A1 | 11/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/022595 A1 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/052313 A1 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

Bagotsky, V.S. "Conductive Polymers: Polymers with Ionic Functions" *Fundamentals of Electrochemistry*. Dec. 2005 Second Edition. New Jersey: John Wiley & Sons. pp. 454-455.
Bradfield, D.L. Jan. 1984. Conventional Uranium Processing: The Yeelirrie Uranium Project. *Practical Hydromet '83—7th Annual Symposium on Uranium and Precious Metals*. pp. 39-47. Lakewood, CO.
Eloneva et al., "Fixation of CO2 by carbonating calcium derived from blast furnace slag" Energy (2008) 33, pp. 1461-1467.
Gregerson, J. Aug. 1999. Conquering Corrosion (in concrete). *Building Design & Construction*. 40(8): 50.
Hein, J.R. et al. Feb. 2006. Methanogen c calc te, $^{13}$C-depleted b valve shells, and gas hydrate from a mud volcano offshore southern Cal form a. *Geological Society of America*. 34(2): 109-112.
Horii, Y. et al. 2008. Novel evidence for natural formation of dioxins in ball clay. *Chemosphere*. 70: 1280-1289.
International Search Report dated Apr. 13, 2011 of PCT/US10/57821.
International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated Dec. 14, 2010 of EP09812408.4.
International Search Report dated Jan. 4, 2011 of EP09818485.6.
International Search Report dated Apr. 6, 2011 of EP10192919.8.
International Search Report dated May 18, 2011 of EP09812407.6.

(56) References Cited

OTHER PUBLICATIONS

International Search Report dated Apr. 19, 2011 of PCT/US2010/059835.
Jensen, P. et al. Jul. 1992. 'Bubbling reefs' in the Kattegat: submarine landscapes of carbonate-cemented rocks support a diverse ecosystem at methane seeps. *Marine Ecology Progress Series*. 83: 103-112.
Jones. 1996. Principles and Prevention of Corrosion. Second Edition. Lebanon, Indiana: Prentice Hall. pp. 50-52.
Kostowskyj et al. 2008. Silver nanowire catalysts for alkaline fuel cells. *International Journal of Hydrogen Energy*. 33: 5773-5778.
Merritt, R.C. 1971. Carbonate Leaching. The Extractive Metallurgy of Uranium: pp. 82-97. Colorado School of Mines Research Institute. Prepared Under Contract with the United States Atomic Energy Commission.
Metz. 2005. IPCC Special Report on Carbon Dioxide Capture and Storage. *Cambridge University*. p. 324 <http://books.google.com/books?id=HWgRvPUgyvQC&dq=serpentine+olivine+close+by+cement+plant&source=gbs_navlinks_s> viewed Jul. 15, 2011.
Perkins, S. Jul. 2004. Sea Change: Carbon Dioxide Imperils Marine Ecosystems. *Science News*. 166(3): 35.
Shaffer, R. Aug. 2008 A Devlish Green Angel. *Fast Company*. N127: 92-97.
Skrzypek, G. et al. Jul. 2006. $\delta^{13}C$ analyses of calcium carbonate: comparison between the GasBench and elemental analyzer techniques. *Rapid Communications in Mass Spectrometry*. 20: 2915-2920.
Technology for Commercialization of Slag. Feb. 1995. *New Technology Japan*. ISSN: 0385-6542. p. 35.
Various authors. 2001. "Calcium Carbonate: From the Cretaceous Period Into the 21st Century." *Birkhauser Verlag*, pp. 1-54. <http://books.google.com/books?id=pbkKGa19k5QC&Ipg=PA15&ots=gjtJUiWmGIR&dq=vaterite%20limestone&pg=PA54#v=twopage&q&f=true> viewed Jul. 14, 2011.
U.S. Appl. No. 60/921,598, filed Apr. 3, 2007, Little et al.
Aker, "Aker Clean Carbon, Carbon Capture Solutions Provider" Aker Clean Carbon Presentation for UN's IPCC; Jan. 24, 2008; 8pp.
Alexander, G. et al., "Evaluation of reaction variables in the dissolution of serpentine for mineral carbonation"; Elsevier; ScienceDirect Fuel 86 (2007) 273-281.
Allen, L.M. 1992. Boron and Sulfur Isotopic Fractionation in the Coal Combustion System. A Thesis Submitted to the Faculty of the Department of Hydrology and Water Resources. The University of Arizona.
Avery, G.B. et al. 2006. Carbon isotopic characterization of dissolved organic carbon in rainwater: Terrestrial and marine influences. *Science Direct*. 40(39): 7539-7545. Retrieved from the internet on May 20, 2010.
Back, M. et al.,"Reactivity of Alkaline Lignite Fly Ashes Towards CO in Water." *Environmental Science & Technology*. vol. 42, No. 12 (2008) pp. 4520-4526.
Baer, D.S., et al. 2002. Sensitive absorption measurements in the near-infrared region using off-axis integrated-cavity-output spectroscopy. *Appl. Phys. B*. 5 pages.
Bauer, C.F., et al. 1981. Identification and Quantitation of Carbonate Compounds in Coal Fly Ash. *American Chemical Society*. 15(7): 783-788.
Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.
Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.
Biennier, L., et al. 2004. Multiplex integrated cavity output spectroscopy of cold PAH cations. *Chemical Physics Letters*. 387: 287-294.
"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.
Bommaraju, T.V. et al. 2001. Brine Electrolysis. <http://electrochem.cwru.edu/encycl/art-b01-brine.htm>. Retrieved on Oct. 6, 2010. pp. 1-25.
Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.
Bond, G.M., et al. 2002. Brines as possible cation sources for biomimetic carbon dioxide sequestration. *American Geophysical Union Abstract* #U22A-07.
Bottomley, D.J. et al. 1999. The origin and evolution of Canadian Shield brines: evaporation or freezing of seawater? New lithium isotope and geochemical evidence from the Slave craton. *Chemical Geology*. 155: 295-320.
Cannell, M.G.R. 2003. "Carbon sequestration and biomass energy offset: theoretical, potential and achievable capacities globally, in Europe and the UK." Biomass and Bioenergy. 24: 97-116.
Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.
Cerling, T.E. 1984. The stable isotopic composition of modern soil carbonate and its relationship to climate. *Earth and Planetary Science Letters*. 71: 229-240.
Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.
Ciccs "Aims and Research"; www.nottingham.ac.uk/carbonmanagement/ccs_aims.php 2pp Aug. 3, 2007.
Criss, R.E. 1995. Stable Isotope Distribution: Variations from Temperature, Organic and Water-Rock Interactions. Washington University, St. Louis, Department of Earch and Planetary Sciences. *American Geophysical Union*. pp. 292-307.
Dickens, A. et al. 2004. Reburial of fossil organic carbon in marine sediments. *Nature*. 427: 336-339. Retrieved from the internet on May 20, 2010.
Druckenmiller, M. et al., "Carbon sequestration using brine of adjusted pH to form mineral carbonates"; Elsevier; www.elsevier.com/locate/fuproc; Fuel Processing Technology 86 (2005) 1599-1614.
Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.
"Electrochemical cell", Wikipedia (2009), http:en.wikipedia.org/wiki/Electrochemical_Cell, Nov. 24, 2009, 5 pp.
Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.
Eurodia. Bipolar Membrane Electrodialysis. Available online as of 2001.; visited Oct. 6, 2010 at http://www.eurodia.com/html/eb.html.
Fallick, A.E., et al. 1991. A Stable Isotope Study of the Magnesite Deposits Associated with the Alpine-Type Ultramafic Rocks of Yugoslavia. *Economic Geology*. 86: 847-861.
Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).
Faverjon, F. et al. 2005. Electrochemical study of a hydrogen diffusion anode-membrane assembly for membrane electrolysis. *Electrochimica Acta* 51 (3): 386-394.
Faverjon, F. et al. 2006. Regeneration of hydrochloric acid and sodium hydroxide from purified sodium chloride by membrane electrolysis using a hydrogen diffusion anode-membrane assembly. *Journal of Membrane Science* 284 (1-2): 323-330.
Filley, T.R. et al. 1997. Application of Isotope-Ratio-Monitoring Gas Chromatography/Mass Spectrometry to Study Carbonization Reac-

(56) References Cited

OTHER PUBLICATIONS tions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.
Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research.* 70(3): 565-585.
Gain, E. et al. 2002. Ammonium nitrate wastewater treatment by coupled membrane electrolysis and electrodialysis. *Journal of Applied Electrochemistry* 32: 969-975.
Genders, D. 1995. Electrochemical Salt Splitting. http://www.electrosynthesis.com/news/mwatts.html (accessed Feb. 5, 2009).
Gillery et al. Bipolar membrane electrodialysis: the time has finally come! Presented 16th Intl. Forum on Appl. Electrochem; Cleaner Tech.-Challenges and Solutions. Nov. 10-14, 2002. Amelia Island Plantation, FL. 4 pages. Retrieved form the Internet on Aug. 14, 2009. http://www.ameridia.com/html.ebc.html.
Goldberg et al. Jun. 2009. "CO2 Mineral Sequestration Studies in US"; National Energy Technology Laboratory; goldberg@netl.doe.gov; 10pp.
Golden, D.C., et al. 2001. A Simple Inorganic Process for Formation of Carbonates, Magnetite, and Sulfides in Martian Meteorite ALH84001. *American Mineralogist.* 86: 370-375.
Graff "Just Catch—CO2 Capture Technology" Aker Kvaerner; Pareto Clean Energy Tech Seminar Oct. 11, 2007 25pp.
Green Car Congress "PKU Researchers Carry Out Aqueous Fischer-Tropsch Reaction for First Time"; www.greeencarcongress.com/2007/12/pku-researchers.html; Dec. 12, 2007; 2pp.
Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.
Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.
Haywood et al., "Carbon dioxide sequestration as stable carbonate minerals—environmental barriers"; Environmental Geology (2001) 41:11-16; Springer-Verlag 2001.
Hassan, A.M. et al. 1989. Corrosion Resistant Materials for Seawater RO Plants. *Desalination.* 74: 157-170.
Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16pp.
Holdgate, G.R., et al. 2009. Eocene-Miocene carbon-isotope and floral record from brown coal seams in the Gippsland Basin of southeast Australia. *Global and Planetary Change.* 65: 89-103.
Holze, S. et al. 1994. Hydrogen Consuming Anodes for Energy Saving in Sodium Sulphate Electrolysis. *Chem. Eng. Technol.* 17: 382-389.
Horkel, K., et al. 2009. Stable isotopic composition of cryptocrystalline magnesite from deposits in Turkey and Austria. *Geophysical Research Abstracts.* 11. (abstract only).
Horner, G. et al. 2004. Isotope selective analysis of CO2 with tunable diode laser (TDL) spectroscopy in the NIR. *The Analyst.* 129: 772-778.
Huijgen, W.J.J., et al. 2003. Carbon dioxide sequestration by mineral carbonation. ECN-C-03-016; Energy Research Centre of the Netherlands: Petten; pp. 1-42.
Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.
Huijgen, W.J.J., et al. 2005. Mineral CO2 Sequestration by Steel Slag Carbonation. *Environ. Sci. Technol.* 39: 9676-9682.
Huijgen, W.J.J., et al. 2006. Energy Consumption and Net CO2 Sequestration of Aqueous Mineral Carbonation. *Ind. Eng. Chem. Res.* 45: 9184-9194.
Huntzinger, D.N. et al. 2009. A life-cycle assessment of Portland cement manufacturing: comparing the traditional process with alternative technologies. *Journal of Cleaner Production.* 17: 668-675.
Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.
Huntzinger, D.N. et al.,"Carbon Dioxide Sequestration in Cement Kiln Dust through Mineral Carbonation"; Environmental Science & Technology, vol. 43, No. 6 (2009) pp. 1986-1992.
International Search Report dated Sep. 17, 2008 of PCT/US2008/068564.
International Search Report dated Jan. 20, 2009 of PCT/US2007/010032.
International Search Report dated Feb. 19, 2009 of PCT/US08/88242.
International Search Report dated Mar. 3, 2010 of EP08867440.3.
International Search Report dated May 6, 2010 of EP09716193.9.
International Search Report dated Jun. 22, 2010 of EP08772151.0.
International Search Report dated Jul. 29, 2010 of EP08873036.1.
International Search Report dated Mar. 11, 2009 of PCT/US2008/088318.
International Search Report dated Mar. 11, 2009 of PCT/2008/088246.
International Search Report dated Aug. 5, 2009 of PCT/2009/048511.
International Search Report dated Sep. 8, 2009 of PCT/US2009/045722.
International Search Report dated Sep. 17, 2009 of PCT/US2009/050756.
International Search Report dated Sep. 22, 2009 of PCT/US2009/047711.
International Search Report dated Oct. 19, 2009 of PCT/US2009/050223.
International Search Report dated Oct. 30, 2009 of PCT/US09/056573.
International Search Report dated Dec. 14, 2009 of PCT/US09/061748.
International Search Report dated Jan. 4, 2010 of PCT/US09/062795.
International Search Report dated Jan. 13, 2010 of PCT/US09/059135.
International Search Report dated Jul. 7, 2010 of PCT/US10/026880.
International Search Report dated Jul. 9, 2010 of PCT/US10/025970.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.
International Search Report dated Sep. 13, 2010 of PCT/US10/035041.
"Isotopic Signature", Wikipedia (2010), http://en.wikipedia.org/wiki/Isotopic_signature, Apr. 14, 2009, 3 pp.
Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.
Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.
Lackner, K. "Carbonate Chemistry for Sequestering Fossil Carbon"; Annual Review Energy Environ. 2002 27:193-232.
Lackner, K.S. et al. "Carbon Dioxide Disposal in Carbonate Minerals." Energy. 1995. 20(11): 1153-1170.
Levy, D. "Burnt biomass causes short-term global cooling, long-term warming." http://news-service.stanford.edu/news/2004/august4/biomass-84.html. 3 pages.

(56) References Cited

OTHER PUBLICATIONS

Li, et al., "Using Electrolytic Method to Promote CO2 Sequestration in Serpentine by Mineral Carbonation," Journal of China University of Mining and Technology, 26(6), pp. 817-821 (2007).

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Lopez-Capel, E. et al. 2005. Application of simultaneous thermal analysis mass spectrometry and stable carbon isotope analysis in a carbon sequestration study. *Rapid Communications in Mass Spectrometry.* 19: 3192-3198.

Mazrou, S., et al. 1997. Sodium hydroxide and hydrochloric acid generation from sodium chloride and rock salt by electro-electrodialysis. *Journal of Applied Electrochemistry* 27: 558-567.

McCrea, J.M. 1950. On the Isotopic Chemistry of Carbonates and a Paleotemperature Scale. *The Journal of Chemical Physics.* 18(6): 849-857.

Melezhik, V.A., et al. 2001. Palaeproterozoic magnesite: lithological and isotopic evidence for playa/sabkha environments. *Sedimentology.* 48: 379-397.

Mihalcea, R.M., et al. 1998. Diode-laser absorption measurements of CO2 near 2.0 μm at elevated temperatures. *Applied Optics.* 37(36): 8341-8347.

Miljevic, N., et al. 2007. Potential Use of Environmental Isotopes in Pollutant Migration Studies. *Environmental Isotopes in Pollutant Studies.* 58: 251-262.

Montes-Hernandez, G. et al.,"Mineral sequestration of CO2 by aqueous carbonation of coal combustion fly-ash." Journal of Hazardous Materials vol. 161 (2009). pp. 1347-1354.

Mook, W.G., et al. 1968. Isotopic Equilibrium between Shells and Their Environment. *Science.* 159(3817): 874-875.

Mook, W.G., et al. 1974. Carbon Isotope Fractionation Between Dissolved Bicarbonate and Gaseous Carbon Dioxide. 22:169-176.

Mottana, A. et al. 1979. Der grosse Mineralienfuhrer, BLV Verlagsgesellschaft mbH, Munchen, XP002577921, p. 194. (in German with English Translation).

Nayak, V.S. "Nonelectrolytic Production of Caustic Soda and Hydrochloric Acid from Sodium Chloride"; Ind. Eng. Chem. Res. 1996. 35: 3808-3811.

Noda, H., et al. 1990. Electrochemical Reduction of Carbon Dioxide at Various Metal Electrodes in Aqueous Potassium Hydrogen Carbonate Solution. *The Chemical Society of Japan.* 63: 2459-2462.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May (2001) 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

O'Neil, J.R., et al. 1971. C13 and O18 compositions in some freshwater carbonates associated with ultramafic rocks and serpentines: western United States*. *Geochimica et Cosmochimica Acta.* 35: 687-697.

Park, A., et al. 2004. CO2 mineral sequestration: physically activated dissolution of serpentine and pH swing process. *Chemical Engineering Science* 59 (22-23): 5241-5247.

Philp, R.P. 2007. The emergence of stable isotopes in environmental and forensic geochemistry studies: a review. *Environ Chem Lett.* 5:57-66.

Portier et al. 2005. Modeling CO2 solubility in pure water and NaCl-type waters from 0 to 300 ° C. and from 1 to 300 bar Application to the Utsira Formation at Sleipner. *Chemical Geology.* 217: 187-199.

Power, I.M., et al. 2007. Biologically induced mineralization of dypingite by cyanobacteria from an alkaline wetland near Atlin, British Columbia, Canada. *Geochemical Transactions.* 8: 16 pages.

Quay, P.D., et al. 1992. Oceanic Uptake of Fossil Fuel Co$_2$: Carbon- 13 Evidence. *Science.* 256 (5053): 74-79.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management.* 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts.* 11. (abstract only).

Sadhwani et al., "Case Studies on environmental impact of seawater desalination" Science Direct; http://www.sciencedirect.com/science?_ob=ArticleURL&_udi=B6TFX-4HMX97J-3&_u . . . 3pp.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results.* 146: 137-148.

Sakata, M. 1987. Movement and Neutralization of Alkaline Leachate at Coal Ash Disposal Sites. *Environ. Sci. Technol.* 21(8): 771-777.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schwab, E. 2004. Calciumhydroxid, XP-002577920. Retrieved from the Internet: <URL:http://www.roempp.com/prod/index1.html> (In German with English Translation).

Schouten, S., et al. 2004. Stable Carbon Isotopic Fractionations Associated with Inorganic Carbon Fixation by Anaerobic Ammonium-Oxidizing Bacteria. *Applied and Environmental Microbiology.* 70(6): 3785-3788.

Schroll, E. 2002. Genesis of magnesite deposits in the view of isotope geochemistry. *Boletim Paranaense de Geociencias.* 50: 59-68.

Sheppard, S.M.F., et al. 1970. Fractionation of Carbon and Oxygen Isotopes and Magnesium between Coexisting Metamorphic Calcite and Dolomite. *Contr. Mineral. and Petrol.* 26. 161-198.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Sethi, S. et al. 2006. Existing & Emerging Concentrate Minimization & Disposal Practices for Membrane Systems. *Florida Water Resources Journal.* pp. 38, 40, 42, 44, 46, 48.

Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

Sial, A.N., et al. 2000. Carbon isotope fluctuations in Precambrian carbonate sequences of several localities in Brazil. *An. Acad. Bras. Ci.* 72(4): 539-558.

Socolow, R. 1997. Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. *Energy Conversion and Management.* 45: 1845-1859.

(56) References Cited

OTHER PUBLICATIONS

Stanley, S.M., et al. 2002. Low-magnesium calcite produced by coralline algae in seawater of Late Cretaceous composition. *PNAS*. 99(24): 15323-15326.
TECECO Pty Ltd, "Eco-Cement"; www.tececo.com/simple.eco-cement.php; Dec. 29, 2008; 6pp.
Turner, J.A. 1999. "A Realizable Renewable Energy Future." Science. 285 (5428): 687-689.
Uibu, M. et al. "CO2 mineral sequestration in oil-shale wastes from Estonian power production." Journal of Environmental Management vol. 90 (2009). pp. 1253-1260.
Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.
Uliasz-Bochenczyk, A. et al. "Utilization of Carbon Dioxide in Fly Ash and Water Mixtures." Chemical Engineering Research and Design. 2006. 84(A9): 843-846.
U.S. Appl. No. 12/126,776, filed May 23, 2008, Constantz, Brent R., et al, Non-Final Office Action dated Feb. 25, 2010; 21 pp.
U.S. Appl. No. 12/163,205, filed Jun. 27, 2008, Constantz, Brent R., et al, Non-Final Office Action dated Jan. 27, 2010.
U.S. Appl. No. 12/163,205, filed Jun. 27, 2008, Constantz, Brent R., et al, Non-Final Office Action dated Mar. 1, 2010.
U.S. Appl. No. 12/163,205, filed Jun. 27, 2008, Constantz, Brent R., et al, Non-Final Office Action dated Mar. 25, 2010.
U.S. Appl. No. 12/700,129, filed Feb. 4, 2010, Constantz, Brent R., et al, Non-Final Office Action dated Oct. 20, 2010.
U.S. Appl. No. 12/700,193, filed Feb. 4, 2010, Constantz, Brent R., et al, Non-Final Office Action dated Oct. 20, 2010.
U.S. Appl. No. 12/344,019, filed Dec. 24, 2008, Constantz, Brent R., et al, Non-Final Office Action dated Nov. 16, 2009.
U.S. Appl. No. 12/344,019, filed Dec. 24, 2008, Constantz, Brent R., et al, Non-Final Office Action dated Mar. 11, 2010.
U.S. Appl. No. 12/344,019, filed Dec. 24, 2008, Constantz, Brent R., et al, Non-Final Office Action dated Jul. 14, 2010.
U.S. Appl. No. 12/698,741, filed Feb. 2, 2010, Constantz, Brent R., et al, Non-Final Office Action dated Sep. 28, 2010.
U.S. Appl. No. 12/698,802, filed Feb. 2, 2010, Constantz, Brent R., et al, Non-Final Office Action dated Sep. 29, 2010.
U.S. Appl. No. 12/698,483, filed Feb. 2, 2010, Constantz, Brent R., et al, Non-Final Office Action dated Sep. 28, 2010.
U.S. Appl. No. 12/375,632, filed Mar. 5, 2009, Kirk, Donald W. et al, Non-Final Office Action dated Mar. 19, 2010.
U.S. Appl. No. 12/375,632, filed Mar. 5, 2009, Kirk, Donald W. et al, Non-Final Office Action dated Sep. 8, 2009.
U.S. Appl. No. 12/475,378, filed May 29, 2009, Constantz Brent. et al, Final Office Action dated May 5, 2010.
U.S. Appl. No. 12/475,378, filed May 29, 2009, Constantz Brent. et al, Non-Final Office Action dated Mar. 17, 2010.
U.S. Appl. No. 12/475,378, filed May 29, 2009, Constantz Brent. et al, Non-Final Office Action dated Mar. 2, 2010.
U.S. Appl. No. 12/794,198, filed Jun. 4, 2010, Constantz Brent. et al, Non-Final Office Action dated Nov. 4, 2010.
U.S. Appl. No. 12/486,692, filed Jun. 17, 2009, Constantz Brent. et al, Final Office Action dated May 3, 2010.
U.S. Appl. No. 12/486,692, filed Jun. 17, 2009, Constantz Brent. et al, Non-Final Office Action dated Mar. 23, 2010.
U.S. Appl. No. 12/486,692, filed Jun. 17, 2009, Constantz Brent. et al, Non-Final Office Action dated Mar. 1, 2010.
U.S. Appl. No. 12/501,217, filed Jul. 10, 2009, Constantz Brent. et al, Non-Final Office Action dated Mar. 12, 2010.
U.S. Appl. No. 12/557,492, filed Sep. 10, 2009, Constantz, Brent R., et al. Final Office Action dated Sep. 16, 2010.
U.S. Appl. No. 12/557,492, filed Sep. 10, 2009, Constantz, Brent R., et al. Non-Final Office Action dated May 6, 2010.
U.S. Appl. No. 12/604,383, filed Oct. 22, 2009, Constantz Brent R. et al, Non-Final Office Action dated Apr. 5, 2010.
U.S. Appl. No. 12/604,383, filed Oct. 22, 2009, Constantz Brent R. et al, Final Office Action dated Jun. 11, 2010.
U.S. Appl. No. 12/571,398, filed Sep. 30, 2009, Constantz Brent R. et al, Non-Final Office Action dated May 3, 2010.
U.S. Appl. No. 12/826,209, filed Jun. 29, 2010, Constantz Brent R. et al, Non-Final Office Action dated Nov. 5, 2010.
U.S. Appl. No. 12/609,491, filed Oct. 30, 2009, Constantz Brent. et al, Non-Final Office Action dated Mar. 31, 2010.
U.S. Appl. No. 12/609,491, filed Oct. 30, 2009, Constantz Brent. et al, Final Office Action dated Jul. 16, 2010.
U.S. Appl. No. 12/790,317, filed May 28, 2010, Constantz Brent. et al, Non-Final Office Action dated Aug. 17, 2010.
U.S. Appl. No. 12/571,400, filed Sep. 30, 2009, Constantz, Brent. et al, Office Action dated Jul. 26, 2010.
U.S. Appl. No. 12/571,400, filed Sep. 30, 2009, Constantz, Brent. et al, Final Office Action dated Nov. 2, 2010.
U.S. Appl. No. 12/521,256, filed Mar. 5, 2010, Gilliam, Ryan et al, Office Action dated Jul. 28, 2010.
U.S. Appl. No. 12/226,632, filed Sep. 9, 2009, House, Kurt Z. et al, Final Office Action dated Oct. 13, 2010.
U.S. Appl. No. 12/541,055, filed Aug. 13, 2009, Gilliam, Ryan J. et al, Office Action dated Jul. 22, 2010.
U.S. Appl. No. 12/617,005, filed Nov. 12, 2009, Gilliam, Ryan J. et al, Office Action dated Oct. 5, 2010.
Vagin, S.P., et al. 1979. Measurement of the Temperature of Gas Media Containing Carbon Dioxide by the Laser-Probing Method. *Plenum*.
Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved on Dec. 29, 2009] <URL: http://www/jstage.jst.go.jp/article/geochemj/39/4/39_301/_article> ab.
Webber, M.E., et al. 2001. In situ combustion measurements of CO2 by use of a distributed-feedback diode-laser sensor near 2.0 μm. *Applied Optics*. 40(6): 821-828.
Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).
Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.
Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONT0_06-88_0114.PDF>.
Wright, L.L., et al. 1993. "U.S. Carbon Offset Potential Using Biomass Energy Systems." Water, Air, and Soil Pollution. 70: 483-497.
Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.
Zhang, C.L. et al. 2001. Temperature-dependent oxygen and carbon isotope fractionations of biogenic siderite. *Geochimica et Cosmochimica Acta*. 65(14): 2257-2271.
Amelingmeier. "ARAGONIT", Roempp, Fachgebiet: Chemie Unterthema: Mineralogie, Geochimie May 2005, Retrieved from the internet: URL: http://www.roempp.com/prod/ [retrieved on Jun. 19, 2012]—with machine English translation.
Amelingmeier. "Vaterit", Roempp, Fachgebiet: Chemie Unterthema: Mineralogie, Geochimie Nov. 2010, Retrieved from the internet: URL: http://www.roempp.com/prod/ [retrieved on Jun. 19, 2012]—with machine English translation.
Combes, et al Preparation, physical-chemical characterisation and cytocompatibility of calcium carbonate cements Biomaterials. Mar. 2006; 27(9):1945-1954.
Eldorado Beaverlodge Operation. Jun. 1960 Canadian Mining Journal. 81(6): 111-138.
Groteklaes. "DOLOMIT", Roempp, Fachgebiet: Chemie Unterthema: Mineralogie, Geochimie Feb. 2005, Retrieved from the

(56) References Cited

OTHER PUBLICATIONS internet: URL: http://www.roempp.com/prod/ [retrieved on Jun. 19, 2012]—with machine English translation.

International search report and written opinion dated May 28, 2013 for PCT/US2011/023730.

Monteiro, et al. Incorporating carbon sequestration materials in civil infrastructure: A micro and nano-structural analysis. Cement and Concrete Composites. 2013; 40:14-20.

Stepkowska, et al. Calcite, Vaterite and Aragonite forming on cement hydration from liquid and gaseous phase. Journal of Thermal Analysis and Calorimetry. 2003; 73:247-269.

Tari, et al. Colloidal processing of calcium carbonate. Ceramics International. 1998; 24:527-532.

Tsuni, et al. Effects of Trace Lanthanum ion on the Stability of Vaterite and Transformation from Vaterite to Calcite in an Aquatic System. Bulletin of The Chemical Society of Japan. 2001; 74(3):479-486.

Calera. "Investors." Vinod Khosla. Calera.com website, available online at least as of Feb. 16, 2012. http://calera.com/index.php/about_us/our_team/investors/.

European search report and opinion dated Dec. 20, 2011 for EP Application No. 09767687.8.

Hong, et al. Treatment of Strongly Oxidized Water by Three-cell Electrodialysis Stack. Modern Food Science and Technology. 2005; 21(2):88-90.

Miller. "Mixing in Some Carbon." NY Times, Mar. 21, 2010. Viewed on Feb. 16, 2012 at http://www.nytimes.com/201 0/03/22/business/energy-environment/22cement.html.

Mufson. "Khosla, Gates put up $100 million for Kior." Washington Post, p. A 12, Oct. 22, 2013.

Shaffer. "The King of Green Investing." Fast Company, Jul. 1, 2008. Viewed on Feb. 16, 2012 at http://www.fastcompany.com/magazine/127/a-devilish-green-angel.html.

St. John. "Vinod Khosla: Carbon-Capturing Cement Worth as Much as GE's Power Plant Business." Greentechmedia, Sep. 15, 2009. Viewed on Feb. 16, 2012 at http://www.greentechmedia.com/greenlight/post/vinod-khosla-carbon-capturing-cement-worthas-much-as-ges-power-plant-busin/.

\* cited by examiner (A) (B) (C)

Cathode or anode – Front view

LOW-VOLTAGE ALKALINE PRODUCTION USING HYDROGEN AND ELECTROCATALYTIC ELECTRODES

CROSS-REFERENCE

This application is a National stage application under 35 U.S.C. 371 of PCT/US2010/023783 which claims priority to U.S. Provisional Application No. 61/151,472 filed Feb. 10, 2009 and titled "Low Voltage Electrochemical Hydroxide with Circulating Hydrogen Gas"; U.S. Provisional Application No. 61/151,484 filed Feb. 10, 2009 and titled "Electrocatalyst Electrodes for Low-voltage Electrochemical Hydroxide System"; and U.S. Provisional Application No. 61/151,481 filed Feb. 10, 2009 and titled "Low-voltage Electrochemical Hydroxide Cell Stacking System", all herein fully incorporated by reference in their entirety.

BACKGROUND

In many chemical processes an alkaline solution comprising, e.g., hydroxide ions and/or carbonate ions and/or bicarbonate ions is utilized to achieve a chemical reaction, e.g., to neutralize an acid, or buffer the pH of a solution, or precipitate an insoluble hydroxide and/or carbonate and/or bicarbonate from a solution. An alkaline solutions can be produced by an electrochemical system that converts an aqueous salt solution to the alkaline solution and an acid as described in the above-referenced U.S. Provisional patent applications, herein incorporated by reference in their entirety. However, as the process is very energy intensive, a large amount of electrical energy is consumed; also, large amounts of salt and water are consumed. Consequently, lowering the energy and material consumed are very desirable.

SUMMARY

This invention provides for a low-voltage, low-energy electrochemical system and method of producing an alkaline solution, comprising reducing water at the cathode to hydroxide ions and hydrogen gas, and allowing the hydroxide ions to migrate into the cathode electrolyte to produce the alkaline solution. By the system and method, at the anode, hydrogen gas is oxidized to protons without producing a gas at the anode, and the protons are allowed to migrate into the anode electrolyte or an adjacent electrolyte to produce an acid. In some embodiments, the alkaline solution further comprises bicarbonate ions and/or carbonate ions produced by adding carbon dioxide to the cathode electrolyte. In some embodiments, the alkaline solution is produced by applying less than 3V across the anode and cathode. In some embodiments, hydrogen gas produced at the cathode is recovered and directed to the anode where it is reduced to protons.

In some embodiments, an electrocatalyst is provided on the electrodes to catalyze the oxidation of hydrogen at the anode and catalyze the reduction of water to hydroxide ions and hydrogen gas at the cathode.

In some embodiments, a plurality of anodes and cathodes are arranged in series, or in parallel or in a cascading configuration to minimize the energy expended in producing the alkaline solution.

In one embodiment, the system comprises an electrochemical unit comprising an anode compartment comprising a hydrogen-oxidizing anode, a cathode compartment comprising a cathode, and a hydrogen-delivery system configured to deliver hydrogen gas to the anode, wherein the unit is operable connected to a carbon sequestration system configured to sequester carbon dioxide with the cathode electrolyte.

In another embodiment, the system comprises a hydrogen-oxidizing anode in communication with a cathode electrolyte; and a carbon sequestration system configured to sequester carbon dioxide with the cathode electrolyte.

In some embodiments of the system, the hydrogen gas oxidized at the anode is obtained from hydrogen gas generated at a cathode. In some embodiments, the cathode electrolyte comprises added carbon dioxide; in some embodiments, the carbon dioxide is contained in an industrial waste gas. In some embodiments, the cathode electrolyte comprises hydroxide ions and/or carbonate ions and/or bicarbonate ions.

In some embodiments, the system is configured to produce bicarbonate ions and/or carbonate ions and/or hydroxide ions in the cathode electrolyte; produce hydrogen gas at the cathode; and produce protons at the anode by applying less than 3V across the anode and cathode, without producing a gas at the anode.

In some embodiments, the anode and/or cathode comprise an electrocatalyst selected from platinum, a single-crystal nickel, Raney nickel, platinized nickel, a metal carbide ($W_2C$, Pt—$W_2C$), a platinum group metal alloy (Pt-M, where M=Fe, Mn, Cr, Co, Au), a transition metal, a nickel alloy, sintered nickel, a platinum group metals (Pt, Pd, Ru, Rh), gold, silver, a precious or non-precious chalcogenides, a discrete macrocyclic complex of transition metals and biological complexes. In some embodiments, the electrocatalyst is configured on the anode to catalyze the oxidation of hydrogen gas to protons; and on the cathode to catalyze production of hydrogen gas and hydroxide ions.

In some embodiments, the system includes a carbon sequestration system configured to sequester carbon dioxide with the cathode electrolyte; in some embodiments, the carbon dioxide is contained in an industrial waste gas; in some embodiments, the carbon dioxide is sequestered as carbonates and/or bicarbonates comprising divalent cations, e.g., calcium ions and/or magnesium ions.

In some embodiments, the system is configured to produce an acid in the anode electrolyte; in some embodiments, the system includes an acid dissolution system configured to produce divalent cations with the acid; in some embodiments, the divalent cations comprise calcium ions and/or magnesium ions. In some embodiments, the divalent cations are produced by dissolving a mineral with the acid, and are provided to the carbon sequestration system.

In some embodiments, the system comprises a plurality of pairs of anodes and cathodes configured in series to receive a series current through each anode-cathode pair; in some embodiments, the system comprises a plurality of pairs of anodes and cathodes configured in parallel to receive a parallel voltage across each pair anode-cathode pair.

In some embodiments, the system comprises a plurality of pairs of anode electrolytes and cathode electrolytes wherein the cathode electrolyte of a first pair is connected to the cathode electrolyte of a second pair; and wherein the anode electrolyte of a first pair is connected to the anode electrolyte of a second pair. In some embodiments, the pH of the cathode electrolyte of the second pair is equal to or greater than the pH of the cathode electrolyte in the first pair; and the pH of the anode electrolyte of the second pair is equal to or less than the pH of the anode electrolyte of the first pair.

In some embodiments, the system comprises a plurality of pairs of anode electrolytes and cathode electrolytes wherein the cathode electrolyte and anode electrolyte of a second pair comprise cathode electrolyte from a first pair; and the cathode electrolyte and anode electrolyte of a third pair comprise anode electrolyte from the first pair. In some embodiments, the pH of the cathode electrolyte of the second pair is equal to or greater than pH of the cathode electrolyte of the first pair; and the pH of the anode electrolyte of the third pair is equal to or less that pH of the anode electrolyte of the first pair. In some embodiments, the cathode electrolyte of the second pair comprises diluted cathode electrolyte of the first pair; and the anode electrolyte of the third pair comprises diluted anode electrolyte of the first pair.

In another embodiment, the invention provides for a low-voltage, low energy method of producing an alkaline solution, comprising oxidizing hydrogen gas to protons at an anode without producing a gas at the anode; and producing bicarbonate ions in a cathode electrolyte in communication with the anode.

In another embodiment, the method comprises configuring an electrochemical unit comprising: an anode compartment comprising a hydrogen-oxidizing anode, a cathode compartment comprising a cathode, and a hydrogen-delivery system configured to deliver hydrogen gas to the anode, wherein the unit is operable connected to carbon sequestration system; and sequestering carbon dioxide with the cathode electrolyte.

In some embodiments of the method, the voltage applied across the anode and a cathode is less than 3V, and hydrogen gas oxidized at the anode is provided from hydrogen produced at the cathode.

In some embodiments, the method comprises adding carbon dioxide to the cathode electrolyte and producing hydroxide ions and/or carbonate ions and/or bicarbonate ions in the cathode electrolyte; in some embodiments, the carbon dioxide is contained in an industrial waste gas.

In some embodiments of the method, the anode and/or cathode comprises an electrocatalyst selected from platinum, a single-crystal nickel, Raney nickel, platinized nickel, a metal carbide ($W_2C$, Pt—$W_2C$), a platinum group metal alloy (Pt-M, where M=Fe, Mn, Cr, Co, Au), a transition metal, a nickel alloy, sintered nickel, a platinum group metals (Pt, Pd, Ru, Rh), gold, silver, a precious or non-precious chalcogenides, a discrete macrocyclic complexe of transition metals and biological complexes. In some embodiments, the electrocatalyst is configured to catalyze oxidation of hydrogen gas to protons at the anode, and catalyze production of hydrogen gas and hydroxide ions at the cathode.

In some embodiments, the method comprises configuring a carbon sequestration system to sequester carbon dioxide with the cathode electrolyte, wherein the carbon dioxide is contained in an industrial waste gas; in some embodiments, the carbon dioxide is sequestered as carbonates and/or bicarbonates; in some embodiment, the carbonates and/or bicarbonates comprise divalent cations; in some embodiments, the divalent cations comprise calcium ions and/or magnesium ions.

In some embodiments, the method comprises producing an acid in the anode electrolyte; and configuring an acid dissolution system to produce divalent cations with the acid. In some embodiments, the divalent cations comprise calcium ions and/or magnesium ions; and in some embodiments, the method comprises producing divalent cations by dissolving a mineral with the acid. In some embodiments, the method comprises configuring the acid dissolution system to provide divalent cations to the carbon sequestration system.

In some embodiments, the method comprises configuring a plurality of pairs of anodes and cathodes in series to receive a series current through each pair of anode and cathode. In some embodiments, the method comprises configuring a plurality of pairs of anodes and cathodes in parallel to receive a parallel voltage across each anode-cathode pair.

In some embodiments, the method comprises configuring a plurality of pairs of the anode electrolytes and cathode electrolytes whereby the cathode electrolyte of a first pair is connected to the cathode electrolyte of a second pair; and the anode electrolyte of a first pair is connected to the anode electrolyte of a second pair. In some embodiments, the method comprises adjusting the pH of the cathode electrolyte of the second pair to a value equal to or greater than the pH of the cathode electrolyte in the first pair; and adjusting the pH of the anode electrolyte of the second pair to a value equal to or less than the pH of the anode electrolyte of the first pair.

In some embodiments, the method comprises configuring a plurality of pairs of anode electrolytes and cathode electrolytes whereby the cathode electrolyte and anode electrolyte of a second pair comprise cathode electrolyte from a first pair; and the cathode electrolyte and anode electrolyte of a third pair comprise anode electrolyte from the first pair. In some embodiments, the method comprises adjusting the pH of the cathode electrolyte of the second pair to a value equal to or greater than pH of the cathode electrolyte of the first pair; and adjusting the pH of the anode electrolyte of the third pair to a value equal to or less that pH of the anode electrolyte of the first pair.

In various embodiments, the products comprise sodium hydroxide and/or sodium bicarbonate and/or sodium carbonate, hydrochloric acid and an ion-depleted brine from which certain cation and anions have been removed. In some embodiments, the products are utilized to sequester carbon dioxide and other constituents of industrial waste gases, e.g., sulfur gases, nitrogen oxide gases and other combustion gases, by contacting the waste gas with a solution comprising divalent cations and the hydroxide and/or bicarbonate and/or carbonate ions to precipitate divalent cation carbonates and/or bicarbonates as described in commonly assigned U.S. patent application Ser. No. 12/344,019 filed on Dec. 24, 2008, herein incorporated by reference in its entirety. The precipitates, comprising, e.g., calcium and/or magnesium carbonates and/or bicarbonates in various embodiments are utilized as building materials, e.g., as cements and aggregates, as described in commonly assigned U.S. patent application Ser. No. 12/126,776 filed on May 23, 2008, herein incorporated by reference in its entirety.

In another application, the ion-depleted brine from which certain cation and anions have been removed, e.g., sodium and chloride ions, is used as feed water in a desalination system where the ion-depleted is further processed as described in commonly assigned U.S. patent application Ser. No. 12/163,205 filed on Jun. 27, 2008, herein incorporated by reference in its entirety.

In another embodiment, the acid produced in the system and/or the alkaline solution produced in the cathode electrolyte are utilized to dissolve minerals and waste materials comprising divalent cations, e.g., Ca++ and Mg++ to produce divalent cation solutions for use in producing divalent metal ion carbonate precipitates using the cathode electrolyte herein. In various embodiments, the precipitates are used as building materials, e.g., cement and aggregates as described in commonly assigned U.S. patent application Ser. No. 12/126,776, herein incorporated by reference in its entirety.

Advantageously, with the present system and method, since a relatively low voltage is utilized across the anode and cathode to produce the alkaline solution, and since hydrogen gas generated at the cathode is oxidized to protons at the anode without producing a gas at the anode, a relatively low energy is utilized to produce the alkaline solution. Also, by the system and method, since carbon dioxide from industrial waste gases is utilized to produce the alkaline solution, the system and method is utilized to sequester large amounts of carbon dioxide and thus reduce carbon dioxide emissions into the atmosphere. Similarly, the acid produced is utilized in various ways including dissolving materials, e.g., minerals and biomass to produce cation for use in the system.

BRIEF DESCRIPTION OF THE DRAWINGS

The following are brief descriptions of drawings that illustrate embodiments of the invention.

DETAILED DESCRIPTION

Figure 1:
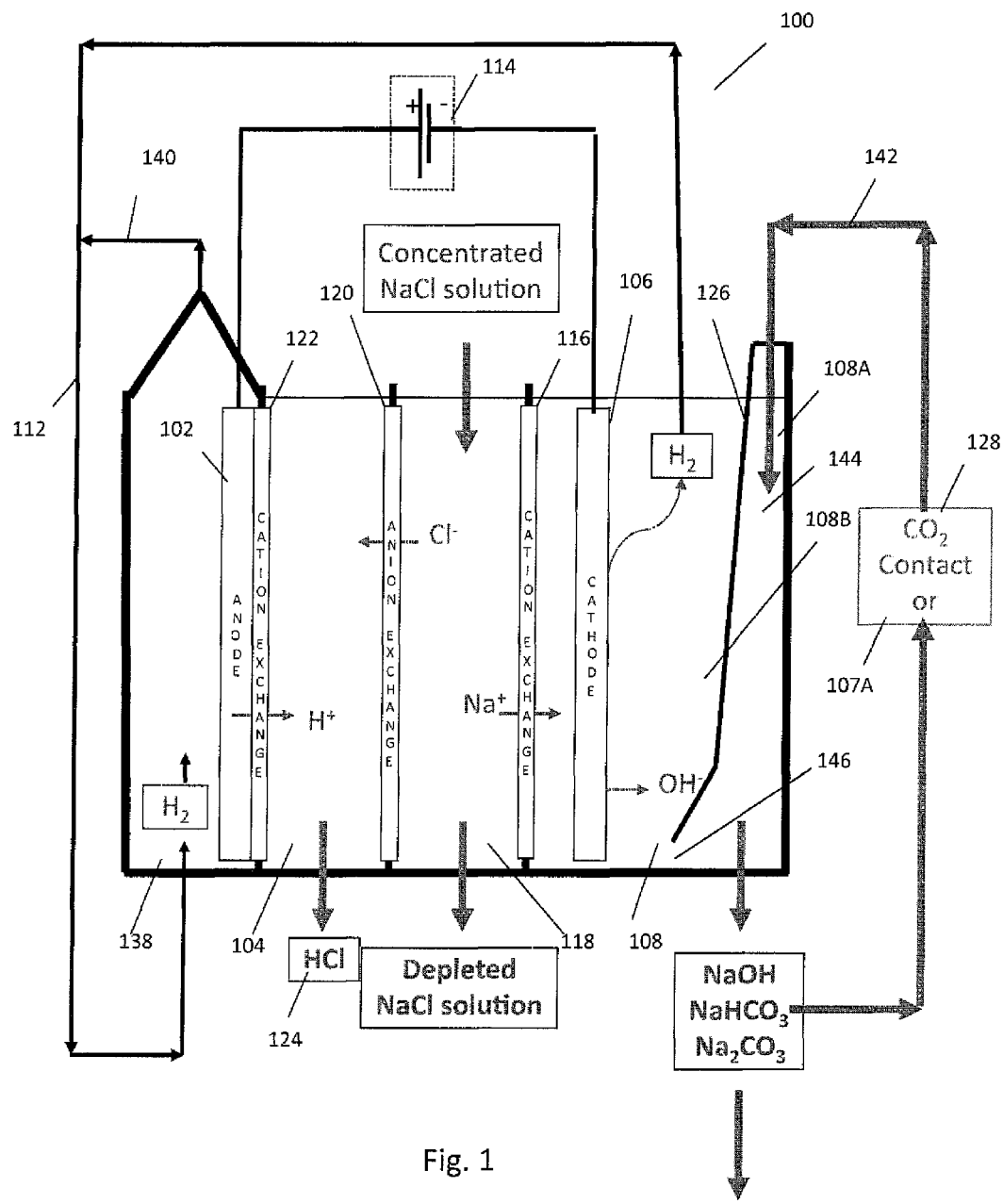
FIG. 1 is an illustration of an embodiment of the system.

This invention provides for a low-voltage/low-energy system and method of producing an alkaline solution in an electrochemical system by oxidizing hydrogen at the anode to protons, and reducing water at the cathode to hydroxide ions and hydrogen at the cathode. In some embodiments, carbon dioxide is added to the cathode electrolyte to produce carbonate ions and/or bicarbonate ions in the cathode electrolyte; a gas is not produced at the anode. In some embodiments, an alkaline solution comprising, e.g., sodium hydroxide and/or sodium carbonate and/or sodium bicarbonate is produced in the cathode electrolyte by applying a voltage across the anode and cathode. In some embodiments, the volts is less than 3V.

In some embodiments, subterranean brine is utilized as a source of salt/cations/anions used in producing the alkaline solution. In some embodiments, electrocatalysts are provided on the electrodes to catalyze the oxidation of hydrogen at the anode and catalyze the production hydroxide ions and hydrogen gas at the cathode. In some embodiments, a plurality of anodes and cathodes are arranged in series, parallel and cascading configurations to minimize the energy expended in producing the alkaline solution. In some embodiments, a salt solution comprising, e.g., sodium chloride, is used to produce the alkaline solution.

In some embodiments, an acid, e.g., hydrochloric acid, is produced in the anode electrolyte from hydrogen ions, produced at the anode and migrated from the anode into the anode, and cations in the cations in the electrolyte, e.g., chloride ions.

In some embodiments, the acid is utilized to dissolve a material, e.g., a mineral, e.g., serpentine or olivine, to provide divalent cation solution, e.g., calcium and magnesium ions, which may in some embodiments be used with the alkaline solution to precipitate carbonates and/or bicarbonates derived from carbon dioxide in a waste gas stream, e.g., carbon dioxide in the exhaust gases of a fossil fuelled power generating plant or a cement producing plant. In some embodiments, sodium chloride solution is used as the anode electrolyte.

In some embodiments, on applying a voltage across the anode and cathode, cations, e.g., sodium ions in the anode electrolyte, migrate from the salt solution through a cation exchange membrane into the cathode electrolyte to produce an alkaline solution comprising, e.g., sodium hydroxide and/or sodium carbonate and/or sodium bicarbonate in the cathode electrolyte; concurrently, anions in the salt solution, e.g., chloride ions, migrate into the anode electrolyte to produce an acid, e.g., hydrochloric acid, with in the protons that form at the anode.

In some embodiments, hydrogen gas and hydroxide ions are produced at the cathode, and in some embodiments, some or all of the hydrogen gas produced at the cathode is directed to the anode where it is oxidized to produce hydrogen ions.

As can be appreciated by one ordinarily skilled in the art, since the embodiments herein can be configured with an alternative or equivalent salt, e.g., a potassium sulfate solution, to produce an equivalent alkaline solution, e.g., potassium hydroxide and/or potassium carbonate and/or potassium bicarbonate in the cathode electrolyte, and an alternative acid, e.g., sulfuric acid in the anode electrolyte, by applying the voltage herein across the anode and cathode, the invention is not limited to the exemplary embodiments described herein, but is useable with an equivalent salt, e.g., potassium sulfate, to produce an alkaline solution in the cathode electrolyte, e.g., potassium carbonate and/or potassium bicarbonate and an acid, e.g., sulfuric acid in the anode electrolyte. Accordingly, to the extent that such equivalents are based on or are suggested by the embodiment herein, these equivalents are within the scope of the appended claims.

In the following detailed description, embodiments of the system and method are described with reference to the one or more illustrated Figures. However, it should be understood that this description is illustrative and is not restrictive since the invention is adaptable for use with other cell configurations including a one-cell, a two-cell, three-cell and other multi-cell configurations, not described in detail herein but are reasonably contemplated.

Similarly, it should be understood that although the invention is described with particularity with use of a brine comprising sodium ions and chloride ions, this description also is also illustrative and is not restrictive since the invention is adaptable for use with equivalent aqueous salt, e.g., sulfates and nitrates and like, e.g., potassium sulfate, as can be appreciated by those ordinarily skilled in the art.

With reference to FIGS. 1-17, in some embodiments, carbon dioxide is added to the cathode electrolyte utilizing a gas mixer/gas absorber. In one embodiment, the gas mixer/gas absorber comprises a series of spray nozzles that produces a flat sheet or curtain of liquid into which the gas is absorbed; in another embodiment, the gas mixer/gas absorber comprises a spray absorber that creates a mist and into which the gas is absorbed; in other embodiments, other commercially available gas/liquid absorber, e.g., an absorber available from Neumann Systems, Colorado, USA is used.

The carbon dioxide added to the cathode electrolyte may be obtained from various industrial sources that releases carbon dioxide including carbon dioxide from combustion gases of fossil fuelled power plants, e.g., conventional coal, oil and gas power plants, or IGCC (Integrated Gasification Combined Cycle) power plants that generate power by burning sygas; cement manufacturing plants that convert limestone to lime; ore processing plants; fermentation plants; and the like. In some embodiments, the carbon dioxide may comprise other gases, e.g., nitrogen, oxides of nitrogen (nitrous oxide, nitric oxide), sulfur and sulfur gases (sulfur dioxide, hydrogen sulfide), and vaporized materials.

In some embodiments, the system includes a gas treatment system that removes constituents in the carbon dioxide gas stream before the carbon dioxide is utilized in the cathode electrolyte. In some embodiments, a portion of, or the entire amount of, cathode electrolyte comprising bicarbonate ions and/or carbonate ions/and or hydroxide ions is withdrawn from the system and is contacted with carbon dioxide gas in an exogenous carbon dioxide gas/liquid contactor to increase the absorbed carbon dioxide content in the solution. In some embodiments, the solution enriched with carbon dioxide is returned to the cathode compartment; in other embodiments, the solution enriched with carbon dioxide is reacted with a solution comprising divalent cations to produce divalent cation hydroxides, carbonates and/or bicarbonates.

In some embodiments, the pH of the cathode electrolyte is adjusted upwards by hydroxide ions that migrate from the cathode, and/or downwards by dissolving carbon dioxide gas in the cathode electrolyte to produce carbonic acid and/or carbonate ions and/or bicarbonate ions that react with and remove hydroxide ions. Thus, it can be appreciated that the pH of the cathode electrolyte is determined, at least in part, by the balance of these processes.

Referring to FIG. 1, the system 100 in one embodiment comprises a gas diffusion anode 102 and a cathode 106 in contact with a cathode electrolyte 108, 108A, 108B comprising dissolved carbon dioxide 107A. The system in some embodiments includes a gas delivery system 112 configured to deliver hydrogen gas to the anode 102; in some embodiments, the hydrogen gas is obtained from the cathode 106. In the system, the anode 102 is configured to produce protons, and the cathode 106 is configured to produce hydroxide ions and hydrogen gas when a low voltage 114, e.g., less than 2V is applied across the anode and the cathode. In the system, a gas is not produced at the anode 102.

As is illustrated in FIG. 1, first cation exchange membrane 116 is positioned between the cathode electrolyte 108, 108A, 108B and a salt solution 118; and an anion exchange membrane 120 is positioned between the salt solution 118 and the anode electrolyte 104 in a configuration where the anode electrolyte 104 is separated from the anode 102 by second cation exchange membrane 122. In the system, the second cation exchange membrane 122 is positioned between the anode 102 and the anode electrolyte 104 such that anions may migrate from the salt solution 118 to the anode electrolyte 104 through the anion exchange membrane 120; however, anions are prevented from contacting the anode 102 by the second cation exchange membrane 122 adjacent to the anode 102.

In some embodiments, the system is configurable to migrate anions, e.g., chloride ions, from the salt solution 118 to the anode electrolyte 104 through the anion exchange membrane 120; migrate cations, e.g., sodium ions from the salt solution 118 to the cathode electrolyte 108, 108A, 108B through the first cation exchange membrane 116; migrate protons from the anode 102 to the anode electrolyte 104; and migrate hydroxide ions from the cathode 106 to the cathode electrolyte 108, 108A, 108B. Thus, in some embodiments, the system can be configured to produce sodium hydroxide and/or sodium bicarbonate and/or sodium carbonate in the cathode electrolyte 108, 108A, 108B; and produce an acid e.g., hydrochloric acid 124 in the anode electrolyte.

In some embodiments as illustrated in FIG. 1, the system comprises a partition 126 that partitions the cathode electrolyte 108 into a first cathode electrolyte portion 108A and a second cathode electrolyte portion 108B, wherein the second cathode electrolyte portion 108B, comprising dissolved carbon dioxide, contacts the cathode 106; and wherein the first cathode electrolyte portion 108A comprising dissolved carbon dioxide and gaseous carbon dioxide is in contact with the second cathode electrolyte portion 108B under the partition 126. In the system, the partition is positioned in the cathode electrolyte such that a gas, e.g., carbon dioxide in the first cathode electrolyte portion 108A is isolated from cathode electrolyte in the second cathode electrolyte portion 108B. Thus, for example, where a gas, e.g., hydrogen, is generated at the cathode and it is desired to separate this cathode gas from a gas or vapor that may evolve from the cathode electrolyte, the partition may serve as a means to prevent mixing of the gases form the cathode and the gases and or vapor from the cathode electrolyte. While this system is illustrated in FIG. 1, it is applicable to any of the electrochemical system described herein, e.g., the systems illustrated in FIGS. 4, 7 and 8.

Thus, in some embodiments, on applying the present voltage across the anode and cathode, the system can be configured to produce hydroxide ions and hydrogen gas at the cathode 106; migrate hydroxide ions from the cathode into the cathode electrolyte 108, 108B, 108A; migrate cations from the salt solution 118 to the cathode electrolyte through the first cation exchange membrane 116; migrate chloride ions from the salt solution 118 to the anode electrolyte 104 through the anion exchange membrane 120; and migrate protons from the anode 102 to the anode electrolyte 104. Hence, depending on the salt solution 118 used, the system can be configured to produce an alkaline solution, e.g., sodium hydroxide in the cathode electrolyte.

In some embodiments, the system is operatively connected to a carbon dioxide gas/liquid contactor 128 configured to remove cathode electrolyte from the system and dissolve carbon dioxide in the cathode electrolyte in the gas/liquid contactor before the cathode electrolyte is returned to the system.

In other embodiments, the cathode electrolyte is operatively connected to a system (not shown) that is configured to precipitate divalent cation carbonates and/or divalent cation bicarbonates and/or divalent cation hydroxides from a solution comprising carbon dioxide gas and divalent cations.

Figure 2:
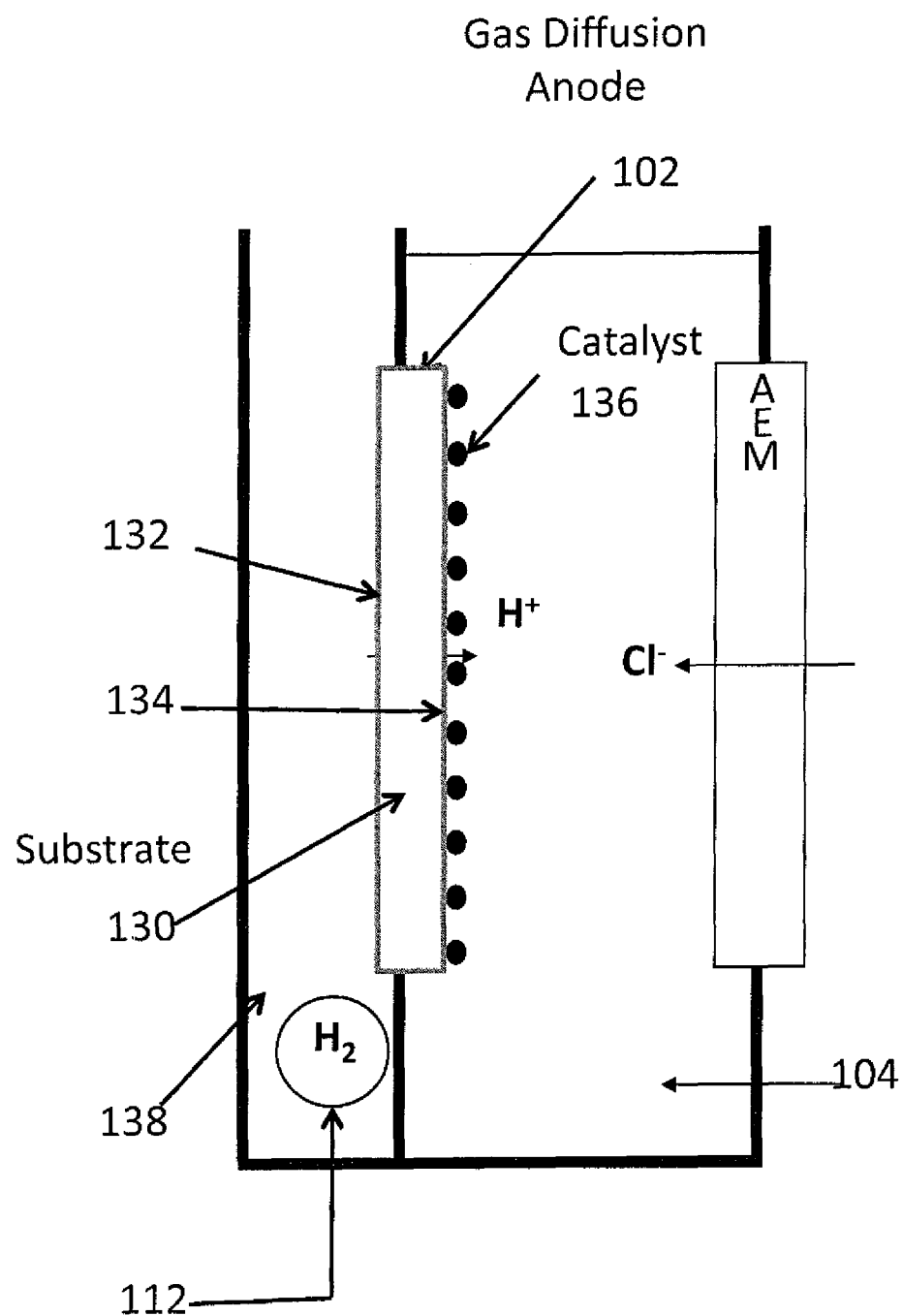
FIG. 2 is an illustration of an embodiment of the system.

FIG. 2 illustrates a schematic of a suitable gas diffusion anode that can be used in embodiments of the system described herein. In some embodiments, the gas diffusion anode comprises a conductive substrate 130 infused with a catalyst 136 that is capable of catalyzing the oxidation of hydrogen gas to protons when the present voltages are applied across the anode and cathode. In some embodiments, the anode comprises a first side 132 that interfaces with hydrogen gas provided to the anode, and an opposed second side 134 that interfaces with the anode electrolyte 104. In some embodiments, the portion of the substrate 132 that interfaces with the hydrogen gas is hydrophobic and is relatively dry; and the portion of the substrate 134 that interfaces with the anode electrolyte 104 is hydrophilic and may be wet, which facilitates migration of protons from the anode to the anode electrolyte. In various embodiments, the substrate is porous to facilitate the movement of gas from the first side 132 to the catalyst 136 that may be located on second side 134 of the anode; in some embodiments, the catalyst may also be located within the body of the substrate 130. The substrate 130 may be selected for its hydrophilic or hydrophobic characteristics as described herein, and also for its low ohmic resistance to facilitate electron conduction from the anode through a current collector connected to the voltage supply 114; the substrate may also be selected for it porosity to ion migration, e.g., proton migration, from the anode to the anode electrolyte 116.

In some embodiments, the catalyst may comprise platinum, ruthenium, iridium, rhodium, manganese, silver or alloys thereof. Suitable gas diffusion anodes are available commercially, e.g., from E-TEK (USA) and other suppliers.

Figure 8:
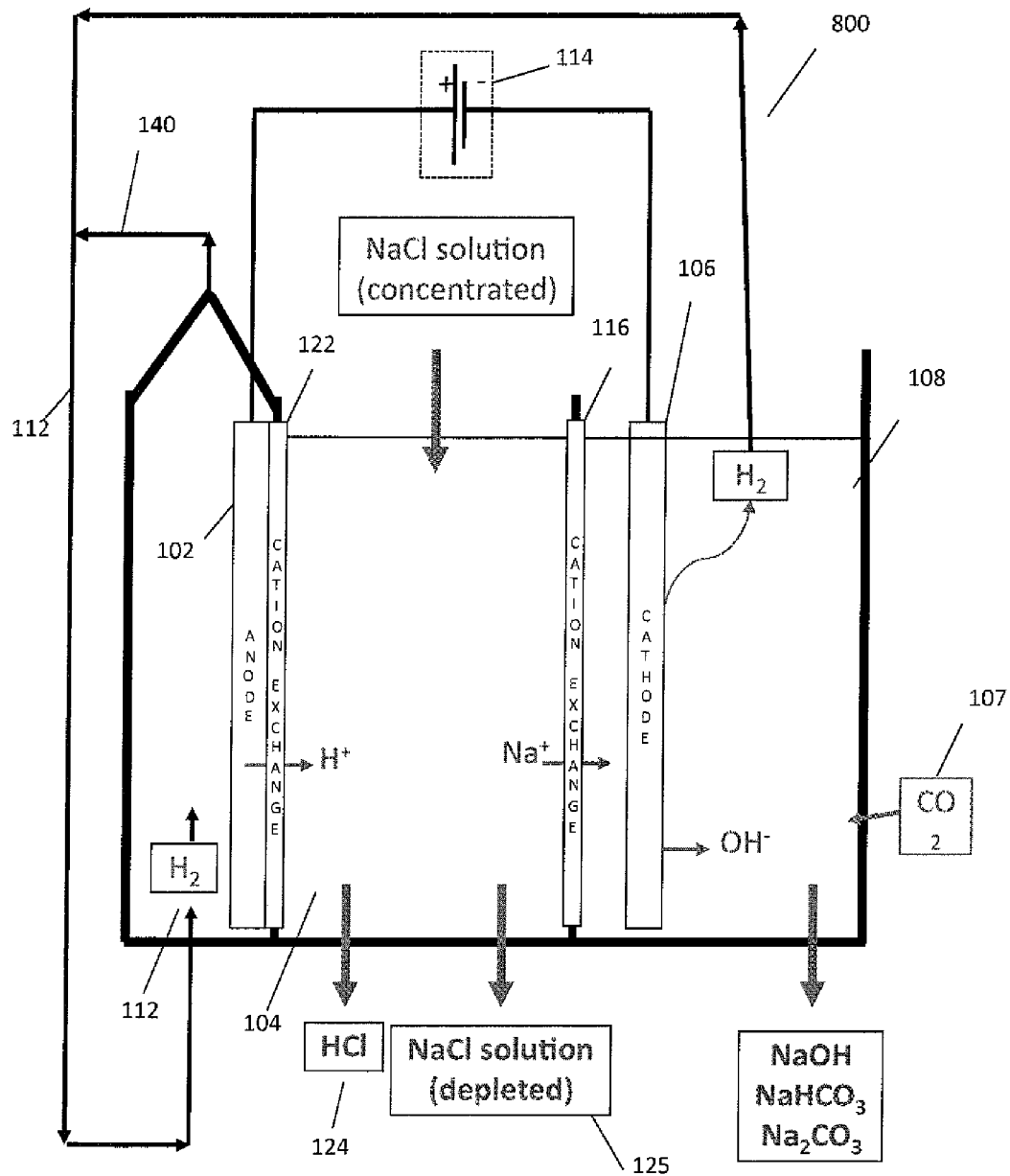
FIG. 8 is a flow chart of an embodiment of the system.

In some embodiments of the anode as is illustrated in FIG. 8, the anode comprises a ion exchange membrane, e.g., a cation exchange membrane 122 that contacts the second side 134 of the anode. In such embodiments, the ion exchange membrane can be used to allow or prevent migration of ions to or from the anode. Thus, for example, with reference to FIG. 8, when protons are generated at the anode, a cation exchange membrane may be used to facilitate the migration of the protons from the anode and/or block the migration of ions, e.g., cations to the substrate. In the some embodiments, the ion exchange membrane may be selected to preferentially allow passage of one type of cation, e.g., hydrogen ions, while preventing the passage of another type of ions, e.g., sodium ions.

As is illustrated in FIG. 1, the system includes a salt solution 118 located between the anode electrolyte 104 and the cathode electrolyte 108, 108A, 108B. In some embodiments, the cathode electrolyte is separated from the salt solution by a first cation exchange membrane 116 that is allows migration of cations, e.g., sodium ions, from the salt solution to the cathode electrolyte. The first cation exchange membrane 116 is also capable of blocking the migration of anions from the cathode electrolyte 108, 108A, 108B to the salt solution 118. In some embodiments, the anode electrolyte 104 is separated from the salt solution 118 by an anion exchange membrane 108 that will allow migration of anions, e.g., chloride ions, from the salt solution 118 to the anode electrolyte 104. The anion exchange membrane, however, will block the migration of cations, e.g., protons from the anode electrolyte 104 to the salt solution 118.

With reference to FIGS. 1 and 2, the system includes a hydrogen gas supply system 112 configured to provide hydrogen gas to the anode 102. The hydrogen may be obtained from the cathode 106 or may be obtained from external source, e.g., from a commercial hydrogen gas supplier, e.g., at start-up of the system when the hydrogen supply from the cathode is insufficient. In the system, the hydrogen gas is oxidized to protons and electrons; un-reacted hydrogen gas is recovered and circulated 140 at the anode.

Referring to FIG. 1, in operation, the cathode electrolyte 108, 108A, 108B is initially charged with a alkaline electrolyte, e.g., sodium hydroxide solution, and the anode electrolyte 104 is initially charged with an acidic electrolyte, e.g., dilute hydrochloric acid. The cathode electrolyte is also initially charged with carbon dioxide gas 107A, 128, and hydrogen gas is provided to the anode. In the system, on applying a voltage across the anode and cathode, protons produced at the anode will enter into the anode electrolyte and attempt to migrate from the anode electrolyte 104 to the cathode 106 via the salt solution 118 between the cathode and anode. However, since the anion exchange membrane will block the migration of protons to the salt solution, the protons will accumulate in the anode electrolyte 104.

Simultaneously at the cathode 106, the voltage across the anode and cathode will produce hydroxide ions and hydrogen gas at the cathode. In some embodiments, the hydrogen produced at the cathode is recovered and directed to the anode 102 where it is oxidized to protons. In the system, hydroxide ions produced at the cathode 106 will enter into the cathode electrolyte 108, 108A, 108B from where they will attempt to migrate to the anode 102 via the salt solution 118 between the cathode and anode. However, since the cathode electrolyte 108, 108A, 108B is separated from the salt solution electrolyte by the first cation exchange membrane 116 which will block the passage of anions, the first cation exchange membrane will block the migration of hydroxide ions from the cathode electrolyte to the salt solution; consequently, the hydroxide ions will accumulate in the cathode electrolyte 108, 108A, 108B.

In the system as illustrated in FIG. 1, with the voltage across the anode and cathode, since the salt solution is separated from the cathode electrolyte by the first cation exchange membrane 116, cations in the salt solution, e.g., sodium ions, will migrate through the first cation exchange membrane 116 to the cathode electrolyte 108, 108A, 108B, and anions, e.g., chloride ions, will migrate to the anode electrolyte through the anion exchange membrane 120. Consequently, in the system, as illustrated in FIG. 1, an acid, e.g., hydrochloric acid 124 will be produced in the anode electrolyte 104, and alkaline solution, e.g., sodium hydroxide will be produced in the cathode electrolyte. As can be appreciated, with the migration of cations and anions from the salt solution, the system in some embodiments can be configured to produce a partly de-ionized salt solution from the salt solution 118. In some embodiments, this partially de-ionized salt solution can be used as feed-water to a desalination facility (not shown) where it can be further processed to produce desalinated water as described in commonly assigned U.S. patent application Ser. No. 12/163,205 filed on Jun. 27, 2008, herein incorporated by reference in its entirety; alternatively, the solution can be used in industrial and agricultural applications where its salinity is acceptable.

With reference to FIG. 1, the system in some embodiments includes a second cation exchange membrane 124, attached to the anode substrate 105, such that it separates the anode 102 from the anode electrolyte. In this configuration, as the second cation exchange membrane 122 is permeable to cations, protons formed at the anode will migrate to the anode electrolyte as described herein; however, as the second cation exchange membrane 122 is impermeable to anions, anions, e.g., chloride ions, in the anode electrolyte will be blocked from migrating to the anode 102, thereby avoiding interaction between the anode and the anions that may interact with the anode, e.g., by corrosion.

With reference to FIG. 1, in some embodiments, the system includes a partition 128 configured into J-shape structure and positioned in the cathode electrolyte 108, 108A, 108B to define an upward-tapering channel 144 in the upper portion of the cathode electrolyte compartment. The partition also defines a downward-tapering channel 146 in lower portion of the cathode electrolyte. Thus, with the partition in the place, the cathode electrolyte 108 is partitioned into the first cathode electrolyte portion 108A and a second cathode electrolyte portion 108B. As is illustrated in FIG. 1, cathode electrolyte in the first cathode electrolyte portion 108A is in contact with cathode electrolyte in the second cathode electrolyte portion 108B; however, a gas in the first electrolyte portion 108A, e.g., carbon dioxide, is prevented from mixing with cathode electrolyte in the second cathode electrolyte 108B. Although this is illustrated in for the system of FIG. 1, such a configuration may be used in any system where it is desired to partition an electrolyte solution, e.g., a cathode electrolyte such that a gas that is introduced into one portion remains separate from another portion. For example, such a configuration may be used in any system as described herein as, e.g., in FIGS. 7 and 8.

With reference to FIG. 1, the system in some embodiments includes a cathode electrolyte circulating system 142 adapted for withdrawing and circulating cathode electrolyte in the system. In one embodiment, the cathode electrolyte circulating system comprises a carbon dioxide gas/liquid contactor 128 that is adapted for dissolving carbon dioxide in the circulating cathode electrolyte, and for circulating the electrolyte in the system. As can be appreciated, since the pH of the cathode electrolyte can be adjusted by withdrawing and/or circulating cathode electrolyte from the system, the pH of the cathode electrolyte compartment can be by regulated by regulating an amount of cathode electrolyte removed from the system through the carbon dioxide gas/liquid contactor 128.

Figure 4:
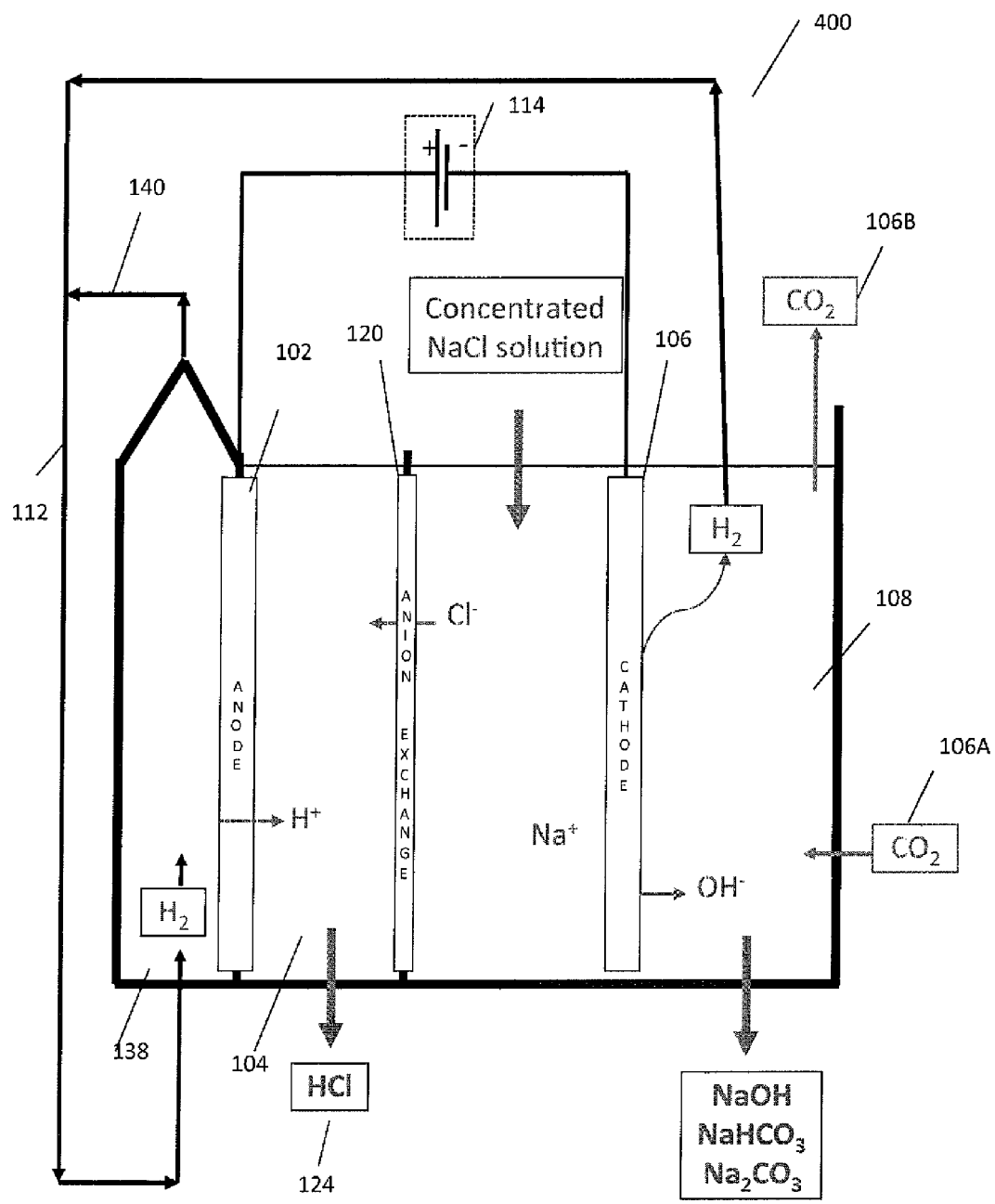
FIG. 4 is an illustration of an embodiment of the system.
Figure 5:
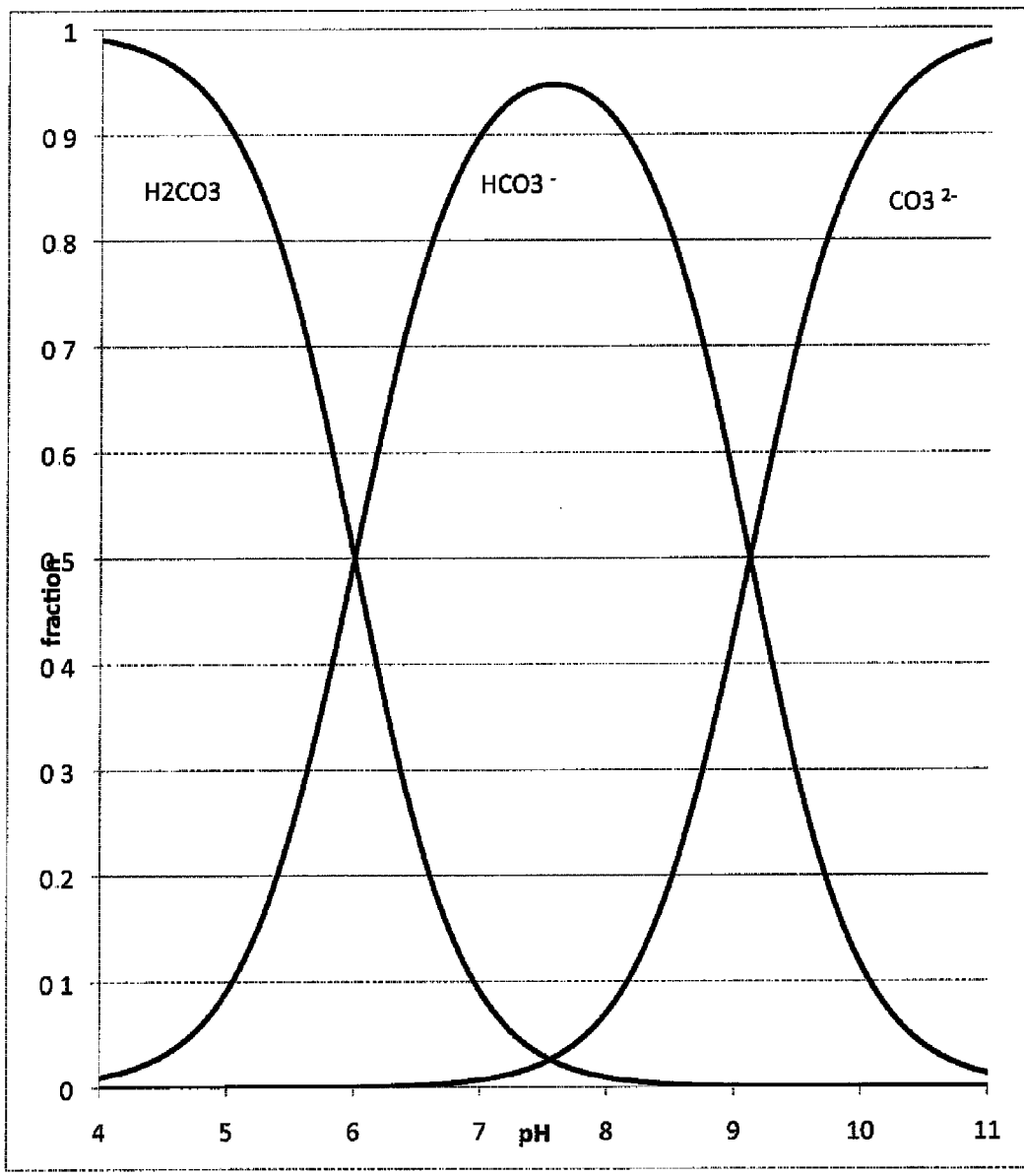
FIG. 5 is an illustration of carbonate ion/bicarbonate ion speciation in water in the system.

In an alternative as illustrated in FIG. 4, the system comprises a cathode 106 in contact with a cathode electrolyte 108 and an anode 102 in contact with an anode electrolyte 104. In this system, the cathode electrolyte comprises a salt solution that functions as the cathode electrolyte as well as a source of chloride and sodium ions for the alkaline and acid solution produced in the system. In this system, the cathode electrolyte is separated from the anode electrolyte by an anion exchange membrane 120 that allows migration of anions, e.g., chloride ions, from the salt solution to the anode electrolyte. As is illustrated in FIG. 4, the system includes a hydrogen gas delivery system 112 configured to provide hydrogen gas to the anode. The hydrogen may be obtained from the cathode and/or obtained from an external source, e.g., a commercial hydrogen gas supplier e.g., at start-up of operations when the hydrogen supply from the cathode is insufficient. In some embodiments, the hydrogen delivery system is configured to deliver gas to the anode where oxidation of the gas is catalyzed to protons and electrons. In some embodiments, unreacted hydrogen gas in the system is recovered and re-circulated to the anode.

Referring to FIG. 4, as with the system of FIG. 1, on applying a voltage across the anode and cathode, protons produced at the anode from oxidation of hydrogen will enter into the anode electrolyte from where they will attempt to migrate to the cathode electrolyte across the anion exchange membrane 120. However, since the anion exchange membrane 120 will block the passage of cations, the protons will accumulate in the anode electrolyte. At the same time, however, the anion exchange membrane 120 being pervious to anions will allow the migration of anions, e.g., chloride ions from the cathode electrolyte to the anode, thus in this embodiment, chloride ions will migrate to the anode electrolyte to produce hydrochloric acid in the anode electrolyte. In this system, the voltage across the anode and cathode is adjusted to a level such that hydroxide ions and hydrogen gas are produced at the cathode without producing a gas, e.g., chlorine or oxygen, at the anode. In this system, since cations will not migrate from the cathode electrolyte across the anion exchange membrane 116, sodium ions will accumulate in the cathode electrolyte 108 to produce an alkaline solution with hydroxide ions produced at the cathode. In embodiments where carbon dioxide gas is dissolved in the cathode electrolyte, sodium ions may also produce sodium bicarbonate and/or sodium carbonate in the cathode electrolyte as described herein with reference to FIG. 1.

With reference to FIG. 1, depending on the pH of the cathode electrolyte, carbon dioxide gas introduced into the first cathode electrolyte portion 108A will dissolve in the cathode electrolyte and reversibly dissociate and equilibrate to produce carbonic acid, protons, carbonate and/or bicarbonate ions in the first cathode electrolyte compartment as follows:

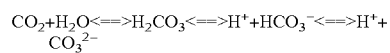

In the system, as cathode electrolyte in the first cathode electrolyte portion 108A may mix with second cathode electrolyte portion 108B, the carbonic acid, bicarbonate and carbonate ions formed in the first cathode electrolyte portion 108A by absorption of carbon dioxide in the cathode electrolyte may migrate and equilibrate with cathode electrolyte in the second cathode electrolyte portion 108B. Thus, in some embodiments, first cathode electrolyte portion 108A may comprise dissolved and un-dissolved carbon dioxide gas, and/or carbonic acid, and/or bicarbonate ions and/or carbonate ions; while second cathode electrolyte portion 108B may comprise dissolved carbon dioxide, and/or carbonic acid, and/or bicarbonate ions and/or carbonate ions.

With reference to FIG. 1, on applying a voltage across anode 102 and cathode 108, the system 100 may produce hydroxide ions and hydrogen gas at the cathode from water, as follows:

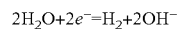

As cathode electrolyte in first cathode electrolyte portion 108A can intermix with cathode electolyte in second cathode electrolyte portion 108B, hydroxide ions formed in the second cathode electrolyte portion may migrate and equilibrate with carbonate and bicarbonate ions in the first cathode electrolyte portion 108A. Thus, in some embodiments, the cathode electrolyte in the system may comprise hydroxide ions and dissolved and/or un-dissolved carbon dioxide gas, and/or carbonic acid, and/or bicarbonate ions and/or carbonate ions. In the system, as the solubility of carbon dioxide and the concentration of bicarbonate and carbonate ions in the cathode electrolyte are dependent on the pH of the electrolyte, the overall reaction in the cathode electrolyte 104 is either:

| | |
|---|---|
| $2H_2O + 2CO_2 + 2e^- = H_2 + 2HCO_3^-$; or | Scenario 1 |
| $H_2O + CO_2 + 2e^- = H_2 + CO_3^{2-}$ | Scenario 2 | or a combination of both, depending on the pH of the cathode electrolyte. This is illustrated in as a arbonate speciation diagram in FIG. 5.

For either scenario, the overall cell potential of the system can be determined through the Gibbs energy change of the reaction by the formula:

$$E_{cell} = -\Delta G/nF$$

Figure 6:
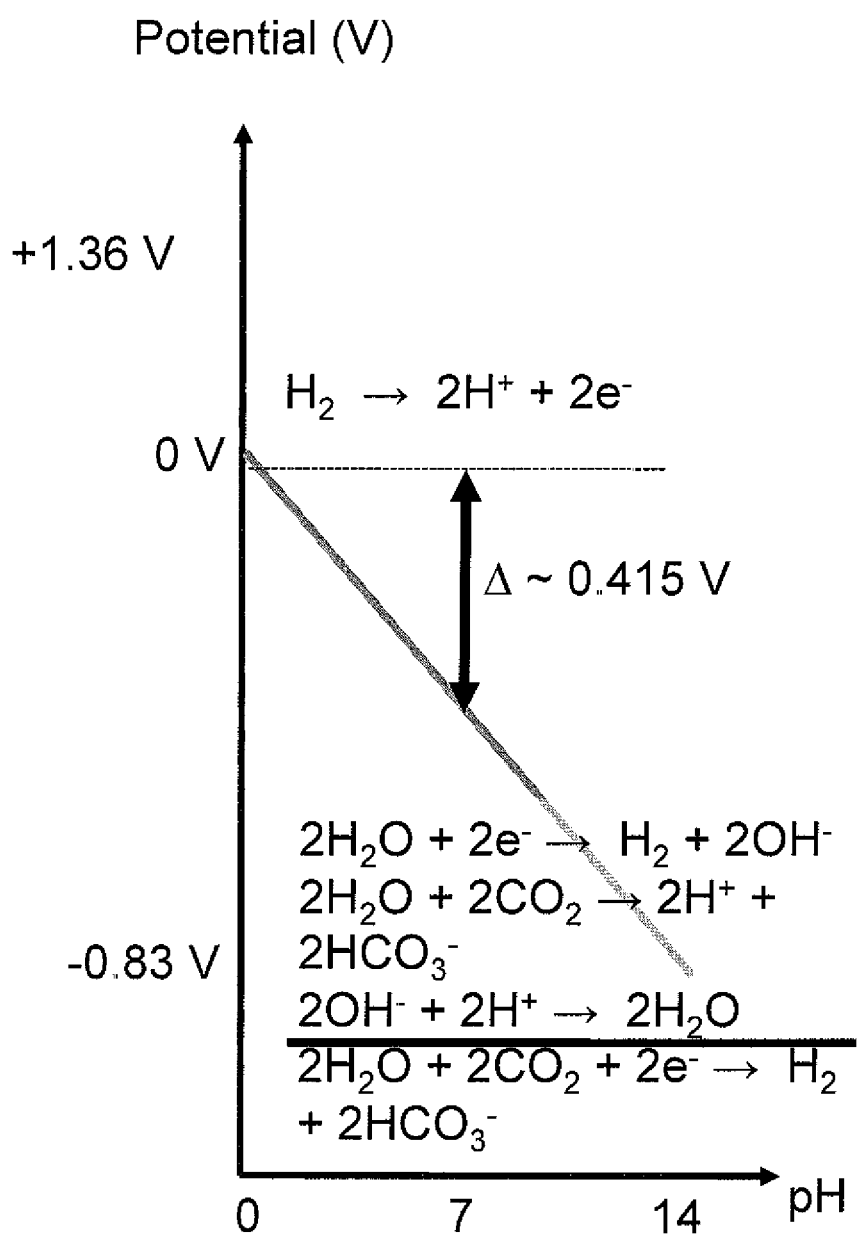
FIG. 6 is an illustration of an effect of adding carbon dioxide to the cathode electrolyte of the system.

Or, at standard temperature and pressure conditions:

$$E°_{cell} = -\Delta G°/nF$$

where, $E_{cell}$ is the cell voltage, $\Delta G$ is the Gibbs energy of reaction, n is the number of electrons transferred, and F is the Faraday constant (96485 J/Vmol). The $E_{cell}$ of each of these reactions is pH dependent based on the Nernst equestion as illustrated in FIG. 6.

Also, for either scenario, the overall cell potential can be determined through the combination of Nernst equations for each half cell reaction:

$$E = E° - RT\ln(Q)/nF$$

where, E° is the standard reduction potential, R is the universal gas constant, (8.314 J/mol K) T is the absolute temperature, n is the number of electrons involved in the half cell reaction, F is Faraday's constant (96485 J/V mol), and Q is the reaction quotient such that:

$$E_{total} = E_{cathode} + E_{anode}.$$

When hydrogen is oxidized to protons at the anode as follows:

$$H_2 = 2H^+ + 2e^-,$$

E° is 0.00 V, n is 2, and Q is the square of the activity of H$^+$ so that:

$$E_{anode} = +0.059 \, pH_a,$$

where $pH_a$ is the pH of the anode electrolyte.
When water is reduced to hydroxide ions and hydrogen gas at the cathode as follows:

$$2H_2O + 2e^- = H_2 + 2OH^-,$$

E° is −0.83 V, n is 2, and Q is the square of the activity of OH$^-$ so that:

$$E_{cathode} = -0.059 \, pH_c,$$

where $pH_c$ is the pH of the cathode electrolyte.

For either Scenario, the E for the cathode and anode reactions varies with the pH of the anode and cathode electrolytes. Thus, for Scenario 1 if the anode reaction, which is occurring in an acidic environment, is at a pH of 0, then the E of the reaction is 0V for the half cell reaction. For the cathode reaction, if the generation of bicarbonate ions occur at a pH of 7, then the theoretical E is 7×(−0.059V)=−0.413V for the half cell reaction where a negative E means energy is needed to be input into the half cell or full cell for the reaction to proceed. Thus, if the anode pH is 0 and the cathode pH is 7 then the overall cell potential would be −0.413V, where:

$$E_{total} = -0.059(pH_a - pH_c) = -0.059 \, \Delta pH.$$

For Scenario 2 in which carbonate ions are produced, if the anode pH is 0 and the cathode pH is 10, this would represent an E of 0.59 V.

Thus, in some embodiments, directing $CO_2$ gas into the cathode electrolyte may lower the pH of the cathode electrolyte by producing bicarbonate ions and/or carbonate ions in the cathode electrolyte, which consequently may lower the voltage across the anode and cathode in producing hydroxide, carbonate and/or bicarbonate in the cathode electrolyte.

Thus, if the cathode electrolyte is allowed to increase to a pH of 14 or greater, the difference between the anode half-cell potential (represented as the thin dashed horizontal line, Scenario 1, above) and the cathode half cell potential (represented as the thick solid sloping line in Scenario 1, above) will increase to 0.83V. With increased duration of cell operation without $CO_2$ addition or other intervention, e.g., diluting with water, the required cell potential will continue to increase. The cell potential may also increase due to ohmic resistance loses across the membranes in the electrolyte and the cell's overvoltage potential.

Herein, an overvoltage potential refers to the voltage difference between a thermodynamically determined half-cell reduction potential, and the experimentally observed potential at which the redox reaction occurs. The term is related to a cell voltage efficiency as the overvoltage potential requires more energy than is thermodynamically required to drive a reaction. In each case, the extra energy is lost as heat. Overvoltage potential is specific to each cell design and will vary between cells and operational conditions even for the same reaction.

In embodiments wherein it is desired to produce bicarbonate and/or carbonate ions in the cathode electrolyte, the system as illustrated in FIGS. 1-2, and as described above with reference to production of hydroxide ions in the cathode electrolyte, can be configured to produce bicarbonate ions and/or carbonate ions in the first cathode electrolyte by dissolving carbon dioxide in the first cathode electrolyte and applying a voltage of less than 3V, or less than 2.5 V, or less than 2V, or less than 1.5V such as less than 1.0V, or even less than 0.8 V or 0.6V across the cathode and anode.

In some embodiments, hydroxide ions and/or carbonate ions and/or bicarbonate ions produced in the cathode electrolyte, and hydrochloric acid produced in the anode electrolyte are removed from the system, while sodium chloride in the salt solution electrolyte is replenished to maintain continuous operation of the system. In some embodiments, the system can be configured to operate in various production modes including batch mode, semi-batch mode, continuous flow mode, with or without the option to withdraw portions of the hydroxide solution produced in the cathode electrolyte, or withdraw all or a portions of the acid produced in the anode electrolyte, or direct the hydrogen gas produced at the cathode to the anode where it may be oxidized.

In some embodiments, hydroxide ions and/or bicarbonate ions and/or carbonate ion solutions are produced in the cathode electrolyte when the voltage applied across the anode and cathode is less than 3V, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V, or less 1.5V or less, 1.4V or less, 1.3V or less, 1.2V or less, 1.1V or less, 1.0V or less, 0.9V or less less, 0.8V or less, 0.7V or less, 0.6V or less, 0.5V or less, 0.4V or less, 0.3V or less, 0.2V or less, or 0.1 V or less.

In another embodiment, the voltage across the anode and cathode can be adjusted such that gas will form at the anode, e.g., oxygen or chlorine, while hydroxide ions, carbonate ions and bicarbonate ions are produced in the cathode electrolyte and hydrogen gas is generated at the cathode. However, in this embodiment, hydrogen gas is not supplied to the anode. As can be appreciated by one ordinarily skilled in the art, in this embodiment, the voltage across the anode and cathode will be generally higher compared to the embodiment when a gas does not form at the anode.

With reference to FIGS. 1-2, in some embodiments, the invention provides for a system comprising one or more anion exchange membrane 120, and cation exchange membranes 116, 122 located between the gas diffusion anode 102 and the cathode 106. In some embodiments, the membranes should be selected such that they can function in an acidic and/or basic electrolytic solution as appropriate. Other desirable characteristics of the membranes include high ion selectivity, low ionic resistance, high burst strength, and high stability in an acidic electrolytic solution in a temperature range of 0° C. to 100° C. or higher, or a alkaline solution in similar temperature range may be used. In some embodiments, a membrane that is stable in the range of 0° C. to 80° C., or 0° C. to 90° C., but not stable above these ranges may be used. For other embodiments, it may be useful to utilize an ion-specific ion exchange membranes that allows migration of one type of cation but not another; or migration of one type of anion and not another, to achieve a desired product or products in an electrolyte. In some embodiments, the membrane should be stable and functional for a desirable length of time in the system, e.g., several days, weeks or months or years at temperatures in the range of 0° C. to 80° C., or 0° C. to 90° C. and higher and/or lower. In some embodiments, for example, the membranes should be stable and functional for at least 5 days, 10 days, 15 days, 20 days, 100 days, 1000 days or more in electrolyte temperatures at 80° C., 70° C., 60° C., 50° C., 40° C., 30° C., 20° C., 10° C., 5° C. and more or less.

The ohmic resistance of the membranes will affect the voltage drop across the anode and cathode, e.g., as the ohmic resistance of the membranes increase, the voltage drop across the anode and cathode will increase, and vice versa. Membranes currently available can be used and they include membranes with relatively low ohmic resistance and relatively high ionic mobility; similarly, membranes currently available with relatively high hydration characteristics that increase with temperatures, and thus decreasing the ohmic resistance can be used. Consequently, as can be appreciated, by selecting currently available membranes with lower ohmic resistance, the voltage drop across the anode and cathode at a specified temperature can be lowered.

Scattered through currently available membrane are ionic channels consisting of acid groups. These ionic channels may extend from the internal surface of the matrix to the external surface and the acid groups may readily bind water in a reversible reaction as water-of-hydration. This binding of water as water-of-hydration follows first order reaction kinetics, such that the rate of reaction is proportional to temperature. Consequently, currently available membranes can be selected to provide a relatively low ohmic and ionic resistance while providing for improved strength and resistance in the system for a range of operating temperatures. Suitable membranes are commercially available from Asahi Kasei of Tokyo, Japan; or from Membrane International of Glen Rock, N.J., and USA.

In some embodiments, the cathode electrolyte 108, 108A, 108B is operatively connected to a waste gas treatment system (not illustrated) where the alkaline solution produced in the cathode electrolyte is utilized, e.g., to sequester carbon dioxide contained in the waste gas by contacting the waste gas and the cathode electrolyte with a solution of divalent cations to precipitate hydroxides and/or carbonates and/or bicarbonates as described in commonly assigned U.S. patent application Ser. No. 12/344,019 filed on Dec. 24, 2008, herein incorporated by reference in its entirety. The precipitates, comprising, e.g., calcium and magnesium hydroxides, carbonates and bicarbonates in some embodiments may be utilized as building materials, e.g., as cements and aggregates, as described in commonly assigned U.S. patent application Ser. No. 12/126,776 filed on May 23, 2008, supra, herein incorporated by reference in its entirety. In some embodiments, some or all of the carbonates and/or bicarbonates are allowed to remain in an aqueous medium, e.g., a slurry or a suspension, and are disposed of in an aqueous medium, e.g., in the ocean depths or a subterranean site.

In some embodiments, the cathode and anode are also operatively connected to an off-peak electrical power-supply system 114 that supplies off-peak voltage to the electrodes. Since the cost of off-peak power is lower than the cost of power supplied during peak power-supply times, the system can utilize off-peak power to produce an alkaline solution in the cathode electrolyte at a relatively lower cost.

In another embodiment, the system produces an acid, e.g., hydrochloric acid 124 in the anode electrolyte 104. In some embodiments, the anode compartment is operably connected to a system for dissolving minerals and/or waste materials comprising divalent cations to produce a solution of divalent cations, e.g., Ca++ and Mg++. In some embodiments, the divalent cation solution is utilized to precipitate hydroxides, carbonates and/or bicarbonates by contacting the divalent cation solution with the present alkaline solution and a source of carbon dioxide gas as described in U.S. patent application Ser. No. 12/344,019 filed on Dec. 24, 2008, supra, herein incorporated by reference in its entirety. In some embodiments, the precipitates are used as building materials e.g., cement and aggregates as described in commonly assigned U.S. patent application Ser. No. 12/126,776, supra, herein incorporated by reference in its entirety.

With reference to FIG. 1, on applying a voltage across the anode 102 and cathode 106, protons will form at the anode from oxidation of hydrogen gas supplied to the anode, while hydroxide ions and hydrogen gas will form at the cathode electrolyte from the reduction of water, as follows:

$H_2 = 2H^+ + 2e^-$ (anode, oxidation reaction)

$2H_2O + 2e^- = H_2 + 2OH^-$ (cathode, reduction reaction)

Since protons are formed at the anode from hydrogen gas provided to the anode; and since a gas such as oxygen does not form at the anode; and since water in the cathode electrolyte forms hydroxide ions and hydrogen gas at the cathode, the system will produce hydroxide ions in the cathode electrolyte and protons in the anode electrolyte when a voltage is applied across the anode and cathode. Further, as can be appreciated, in the present system since a gas does not form at the anode, the system will produce hydroxide ions in the cathode electrolyte and hydrogen gas at the cathode and hydrogen ions at the anode when less than 2V is applied across the anode and cathode, in contrast to the higher voltage that is required when a gas is generated at the anode, e.g., chlorine or oxygen. For example, in some embodiments, hydroxide ions are produced when less than 2.0V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1 V or less is applied across the anode and cathode.

In the system, on applying a voltage across the anode 102 and cathode 106, the positively charged protons formed at the anode will attempt to migrate to the cathode through the anode electrolyte 104, while the negatively charged hydroxide ions formed at the cathode will attempt to migrate to the anode through the cathode electrolyte 108, 108A, 108B. As is illustrated in FIG. 1 and with reference to hydroxide ions in the cathode electrolyte 108, 108A, 108B, since the first cation exchange membrane 116 will restrict the migration of anions from the cathode electrolyte 108, 108A, 108B, and since the anion exchange membrane 120 will prevent the migration of anions from the anode electrolyte 104 to the salt solution 118, the hydroxide ions generated in the cathode electrolyte will be prevented from migrating out of the cathode electrolyte through the cation exchange membrane. Consequently, on applying the voltage across the anode and cathode, the hydroxide ions produced at the cathode will be contained in the cathode electrolyte. Thus, depending on the flow rate of fluids into and out of the cathode electrolyte and the rate of carbon dioxide dissolution in the cathode electrolyte, the pH of the cathode electrolyte will adjust, e.g., the pH may increase, decrease or remain the same.

In some embodiments, depending on the ionic species desired in cathode electroyte 108, 108A, 108B and/or the anode electolyte 104 and/or the salt solution 118, alternative reactants can be utilized. Thus, for example, if a potassium salt such as potassium hydroxide or potassium carbonate is desired in the cathode elelctolyte 1108, 108A, 108B, then a potassium salt such as potassium chloride can be utilized in the salt solution 118. Similarly, if sulfuric acid is desired in the anode electrolyte, then a sulfate such as sodium sulfate can be utilized in the salt solution 118. As described in some embodiments herein, carbon dioxide gas is absorbed in the cathode electrolyte; however, it will be appreciated that other gases, including volatile vapors, can be absorbed in the electrolyte, e.g., sulfur dioxide, or organic vapors to produce a desired result. The gas can be added to the electrolyte in various ways, e.g., by bubbling it directly into the electrolyte, or dissolving the gas in a separate compartment connected to the cathode compartment and then directed to the cathode electrolyte as described herein.

Figure 3:
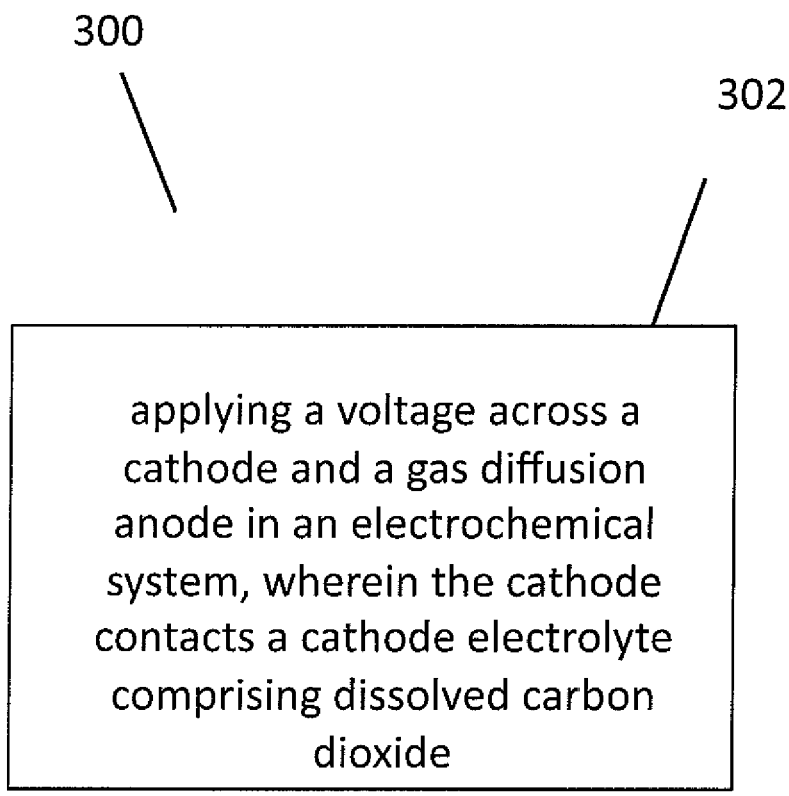
FIG. 3 is an illustration of an embodiment of the method.

With reference to FIGS. 1 and 3, method 300 in some embodiments comprises a step 302 of applying a voltage across a cathode 106 and a gas diffusion anode 102 in an electrochemical system 100, wherein the cathode contacts a cathode electrolyte comprising dissolved carbon dioxide. In some embodiments, the method includes a step of providing hydrogen to the gas diffusion anode 102; a step of contacting the cathode 106 with a cathode electrolyte 108, 108A, 108B comprising dissolved carbon dioxide gas 107A; and a step of applying a voltage 114 across the anode and cathode; a step whereby protons are produced at the anode and hydroxide ions and hydrogen gas produced at the cathode; a step whereby a gas is not produced at the anode when the voltage is applied across the anode and cathode; a step wherein the voltage applied across the anode and cathode is less than 2V; a step comprising directing hydrogen gas from the cathode to the anode; a step comprising whereby protons are migrated from the anode to an anode electrolyte; a step comprising interposing an anion exchange membrane between the anode electrolyte and the salt solution; a step comprising interposing a first cation exchange membrane between the cathode electrolyte and the salt solution, wherein the salt solution is contained between the anion exchange membrane and the first cation exchange membrane; a step comprising whereby anions migrate from the salt solution to the anode electrolyte through the anion exchange membrane, and cations migrate from the salt solution to the cathode electrolyte through the first cation exchange membrane; a step comprising producing hydroxide ions and/or carbonate ions and/or bicarbonate ions in the cathode electrolyte; a step comprising producing an acid in the anode electrolyte; a step comprising producing sodium hydroxide and/or sodium carbonate and/or sodium bicarbonate in the cathode electrolyte; a step whereby hydrochloric acid is produced in the anode electrolyte; a step comprising contacting the cathode electrolyte with a divalent cation solution, wherein the divalent cations comprise calcium and magnesium ions; a step comprising producing partially desalinated water from the salt solution; a step comprising withdrawing a first portion of the cathode electrolyte and contacting the first portion of cathode electrolyte with carbon dioxide; and a step comprising contacting the first portion of cathode electrolyte with a divalent cation solution.

In some embodiments, hydroxide ions are formed at the cathode 106 and in the cathode electrolyte 108, 108A, 108B by applying a voltage of less than 2V across the anode and cathode without forming a gas at the anode, while providing hydrogen gas at the anode for oxidation at the anode. In some embodiments, method 300 does not form a gas at the anode when the voltage applied across the anode and cathode is less than 3V or less, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V or less, 1.5V or less, 1.4V or less, 1.3V or less, 1.2V or less, 1.1V or less, 1.0V or less, 0.9V or less, 0.8V or less, 0.7V or less, 0.6V or less, 0.5V or less, 0.4V or less, 0.3V or less, 0.2V or less, or 0.1 V or less, while hydrogen gas is provided to the anode where it is oxidized to protons. As will be appreciated by one ordinarily skilled in the art, by not forming a gas at the anode and by providing hydrogen gas to the anode for oxidation at the anode, and by otherwise controlling the resistance in the system for example by decreasing the electrolyte path lengths and by selecting ionic membranes with low resistance and any other method know in the art, hydroxide ions can be produced in the cathode electrolyte with the present lower voltages.

In some embodiments, hydroxide ions, bicarbonate ions and carbonate ions are produced in the cathode electrolyte where the voltage applied across the anode and cathode is less than 3.0V, 2.9V, 2.8V, 2.7V, 2.6V, 2.5V, 2.4V, 2.3V, 2.2V, 2.1V, 2.0V, 1.9V, 1.8V, 1.7V, 1.6V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1V or less without forming a gas at the anode. In some embodiments, the method is adapted to withdraw and replenish at least a portion of the cathode electrolyte and the acid in the anode electrolyte back into the system in either a batch, semi-batch or continuous mode of operation.

Figure 7:
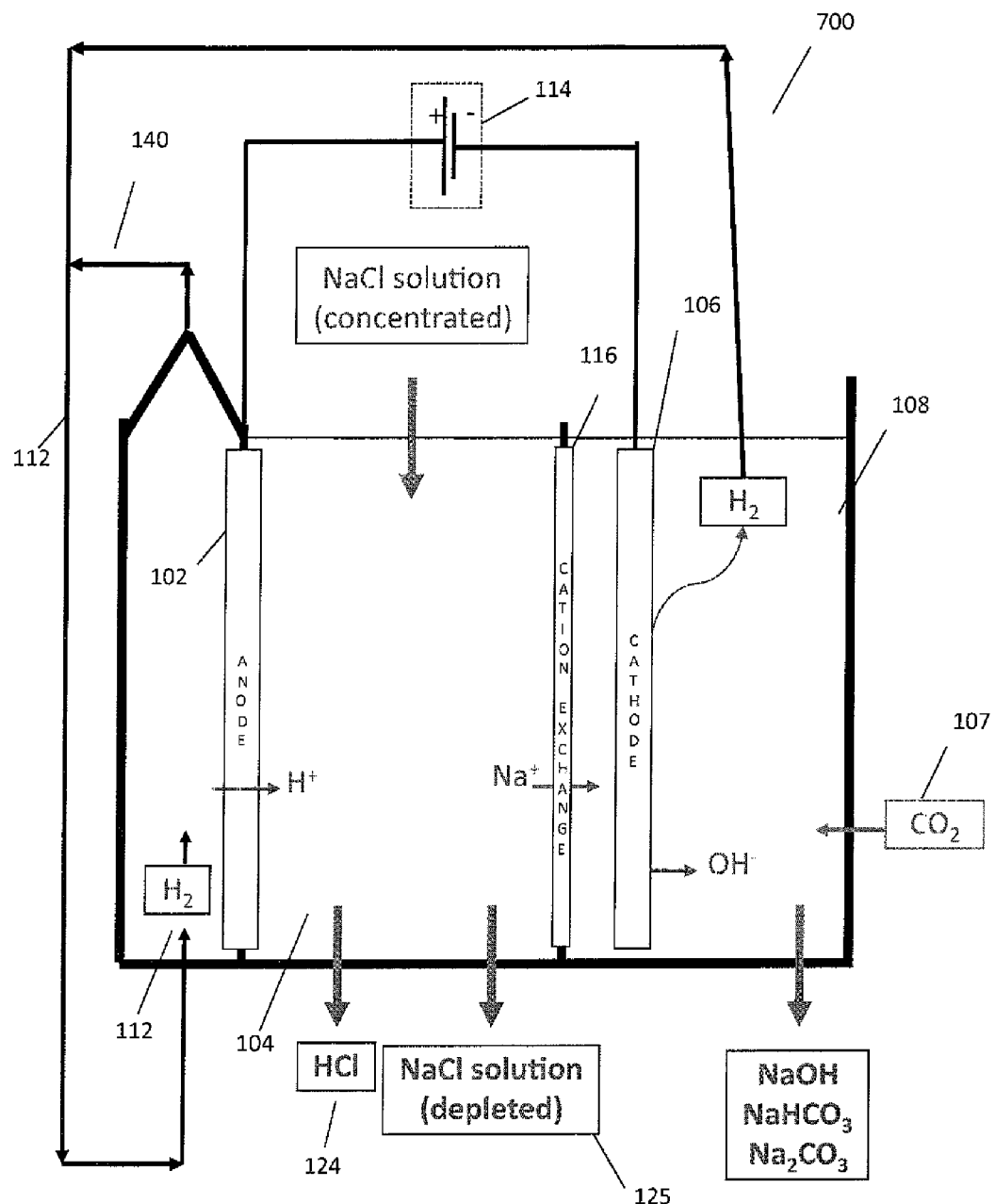
FIG. 7 is an illustration of an embodiment of the system.

With reference to FIG. 7, in one embodiment, the system 700 comprises a cathode 106 in contact with a cathode electrolyte 108 comprising added carbon dioxide 107, wherein the cathode electrolyte is separated from an anode electrolyte 104 by first cation exchange membrane 116. In an embodiment as is illustrated in FIG. 8, the system 800 comprises an anode 102 that is separated from the anode electrolyte by a second cation exchange membrane 122 that is in contact with the anode 102.

In systems as illustrated in FIGS. 1-9, the first cation exchange membrane 116 is located between the cathode 106 and anode 102 such it separates the cathode electrolyte 108 from the anode electrolyte 104. Thus as is illustrated in FIGS. 7 and 8, on applying a relatively low voltage, e.g., less than 2V or less than 1V, across the anode 102 and cathode 106, hydroxide ions (OH$^-$) and hydrogen gas (H$_2$) are produced at the cathode 106, and hydrogen gas is oxidized at the anode 102 to produce hydrogen ions at the anode 102, without producing a gas at the anode. In certain embodiments, the hydrogen gas produced at the cathode is directed to the anode through a hydrogen gas delivery system 112, and is oxidized to hydrogen ions at the anode. In various embodiments, utilizing hydrogen gas at the anode from hydrogen generated at the cathode, eliminates the need for an external supply of hydrogen; consequently, the utilization of energy by the system to produce the alkaline solution is reduced.

Figure 9:
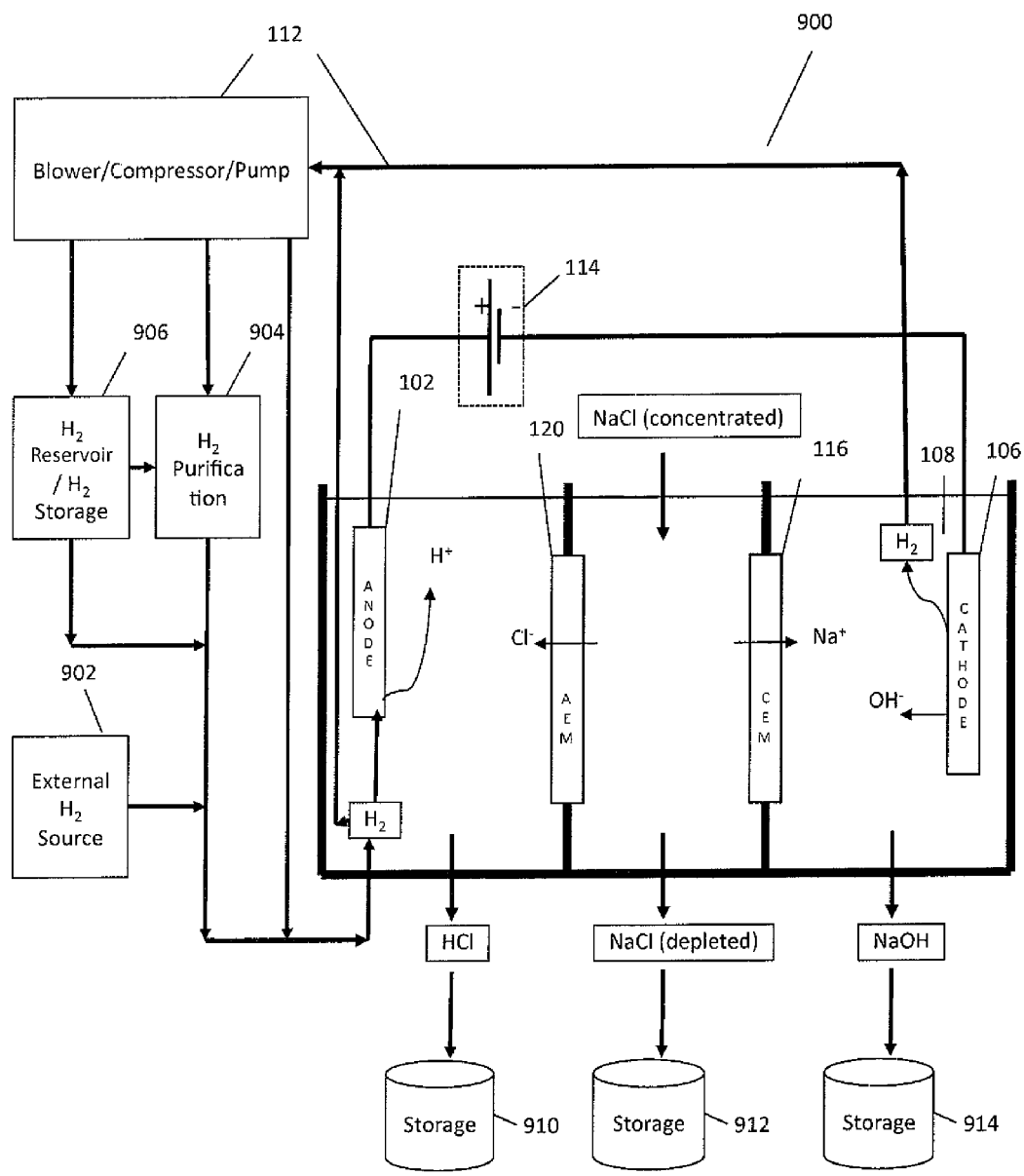
FIG. 9 is an illustration of an embodiment of the hydrogen system.

In certain embodiments as illustrated in FIGS. 1-9, under the applied voltage 114 across the anode 102 and cathode 106, hydroxide ions are produced at the cathode 106 and migrate into the cathode electrolyte 108, and hydrogen gas is produced at the cathode. In certain embodiments, the hydrogen gas produced at the cathode 106 is collected and directed to the anode, e.g., by a hydrogen gas delivery system 122, where it is oxidized to produce hydrogen ions at the anode. Also, as illustrated in FIGS. 7-9, under the applied voltage 114 across the anode 102 and cathode 106, hydrogen ions produced at the anode 102 migrate from the anode 102 into the anode electrolyte 104 to produce an acid, e.g., hydrochloric acid.

In certain embodiments, the first cation exchange membrane 116 is selected to allow passage of cations therethrough while restricting passage of anions therethrough. Thus, as is illustrated in FIGS. 1-9, on applying the low voltage across the anode 102 and cathode 106, cations in the anode electrolyte 104, e.g., sodium ions in the anode electrolyte comprising sodium chloride, migrate into the cathode electrolyte through the first cation exchange membrane 116, while anions in the cathode electrolyte 108, e.g., hydroxide ions, and/or carbonate ions, and/or bicarbonate ions, are prevented from migrating from the cathode electrolyte through the first cation exchange membrane 116 and into the anode electrolyte 104.

As is illustrated in FIGS. 1-9, where the anode electrolyte 104 comprises an aqueous salt solution such as sodium chloride in water, a solution, e.g., and alkaline solution, is produced in the cathode electrolyte 108 comprising cations, e.g., sodium ions, that migrate from the anode electrolyte 104, and anions, e.g., hydroxide ions produced at the cathode 106, and/or carbonate ions and or bicarbonate ions produced by dissolving carbon dioxide 107 in the cathode electrolyte.

Concurrently, in the anode electrolyte 104, an acid, e.g., hydrochloric acid is produced from hydrogen ions migrating from the anode 102 and anions, e.g., chloride ions, present from the anode electrolyte.

As is illustrated in FIG. 8, an anode comprising a second cation exchange membrane 122 is utilized to separate the anode 102 from the anode electrolyte 104 such that on a first surface, the cation exchange membrane 122 is in contact with the anode 102, and an opposed second surface it is in contact with the anode electrode electrolyte 104. Thus, since the second cation exchange membrane is permeable to cations, e.g., hydrogen ions, the anode is in electrical contact with the anode electrolyte through the second cation exchange membrane. In some embodiments, the anode as illustrated in FIG. 8 may comprise a gas diffusion anode as described below.

Thus, in the embodiment of FIG. 8, as with the embodiment illustrated in FIG. 7, on applying the low voltage across the anode 102 and cathode 106, hydrogen ions produced at the anode 102 from oxidation of hydrogen gas at the anode migrate through the second cation exchange membrane 122 into the anode electrolyte 104. At the same time, cations in the anode electrolyte, e.g., sodium ions in the anode electrolyte comprising sodium chloride, migrate from the anode electrolyte 104 into the cathode electrolyte 108 through the first cation exchange membrane 116, while anions in the cathode electrolyte 108, e.g., hydroxide ions, and/or carbonate ions, and/or bicarbonate ions, are prevented from migrating from the cathode electrolyte 108 to the anode electrolyte 104 through the first cation exchange membrane 116.

Also, in the embodiment as illustrated in FIG. 8, hydrogen ions migrating from the anode 102 through the second cation exchange membrane 122 into the anode electrolyte 104 will produce an acid, e.g., hydrochloric acid with the cations, e.g., chloride ions, present in the anode electrolyte; and in the cathode electrolyte 108, an alkaline solution is produce from cations present in the cathode electrolyte and anions, e.g., sodium ions, that migrate from the anode to the cathode electrolyte through the first cation exchange membrane 116.

In some embodiments, cation exchange membranes 116 and 122 are conventional and are available from, for example, Asahi Kasei of Tokyo, Japan; or from Membrane International of Glen Rock, N.J., or DuPont, in the USA. However, it will be appreciated that in some embodiments, depending on the need to restrict or allow migration of a specific cation or an anion species between the electrolytes, a cation exchange membrane that is more restrictive and thus allows migration of one species of cations while restricting the migration of another species of cations may be used as, e.g., a cation exchange membrane that allows migration of sodium ions into the cathode electrolyte from the anode electrolyte while restricting migration of hydrogen ions from the anode electrolyte into the cathode electrolyte, may be used. Such restrictive cation exchange membranes are commercially available and can be selected by one ordinarily skilled in the art.

As is illustrated in FIG. 8, the anode 102 comprises a second cation exchange membrane 112 that separates the anode 102 from the anode electrolyte 104 and is attached to the anode. Thus, in some embodiments, the anode and second cation exchange membrane may comprise an integral gas diffusion anode that is commercially available, or can be fabricated as described for example in co-pending and commonly assigned U.S. Provisional Patent Application No. 61/151,484, titled "Electro-catalyst Electrodes for Low-voltage electrochemical Hydroxide System", filed Feb. 10, 2009, herein fully incorporated by reference. However, notwithstanding that a gas diffusion anode is illustrated and utilized in FIGS. 7 and 8 and described herein, in the some embodiments, any conventional anode that can be configured to oxidize hydrogen gas to produce hydrogen ions as described herein can be utilized.

With reference to FIGS. 1-17, in some embodiments, the cathode electrolyte 108 is operatively connected to a supply of carbon dioxide gas 107, contained, e.g., in an industrial plant, e.g., a power generating plant, a cement plant, or an ore smelting plant. If necessary, this source of carbon dioxide comprises a gas wherein the concentration of carbon dioxide is greater than the concentration of carbon dioxide in the ambient atmosphere. This source of carbon dioxide may also contain other gaseous and non-gaseous components of a combustion process, e.g., nitrogen gas, $SO_X$, $NO_X$, as is described in co-pending and commonly assigned U.S. Provisional Patent application No. 61/223,657, titled "Gas, Liquids, Solids Contacting Methods and Apparatus", filed Jul. 7, 2009 herein fully incorporated by reference. However, as can be appreciated, this source of carbon dioxide can be cleaned and utilized as the carbon dioxide added to the cathode electrolyte 108.

Although carbon dioxide is present in ordinary ambient air, partly due to the very low concentration, ambient carbon dioxide may not provide sufficient carbon dioxide to achieve the results obtained with the present system and method that utilize carbon dioxide taken from an industrial waste gas steam, e.g., from the stack gases of a fossil fuelled power generating plant or a cement production plant. Also, in some embodiments of the system and method, since the cathode electrolyte is contained in closed system wherein the pressure of the added carbon dioxide gas within the system is greater than the ambient atmospheric pressure, ambient air and hence ambient carbon dioxide is typically prevented from infiltrating into the cathode electrolyte.

In some embodiments, and with reference to FIGS. 1-17, carbon dioxide is added to the cathode electrolyte to dissolve and produce carbonic acid that dissociates to hydrogen ions and carbonate ions and/or bicarbonate ions, depending on the pH of the cathode electrolyte. Concurrently, as described above, hydroxide ions, produced from electrolyzing water in the cathode electrolyte, may react with the hydrogen ions to produce water in the cathode electrolyte. Thus, depending on the degree of alkalinity desired in the cathode electrolyte, the pH of the cathode electrolyte may be adjusted and in some embodiments is maintained between and 7 and 14 or greater; or between 7 and 9; or between 8 and 11 as is well understood in the art, and as illustrated in carbonate speciation diagram of FIG. 5. In some embodiments, the pH of the cathode electrolyte may be adjusted to any value between 7 and 14 or greater, including a pH 7.0, 7.5, 8.0, 8.5, 9.0, 9.5, 10.0, 10.5, 11.0, 11.5, 12.0, 12.5, 13.0, 13.5, 14.0 and greater.

Similarly, in some embodiments of the system, the pH of the anode electrolyte is adjusted and is maintained between less than 0 and up to 7 and/or between less than 0 and up to 4, by regulating the concentration of hydrogen ions that migrate into the anode electrolyte from oxidation of hydrogen gas at the anode, and/or the withdrawal and replenishment of anode electrolyte in the system. In this regard and as can be appreciated by one ordinarily skilled in the art and with reference to FIG. 6, since the voltage across the anode and cathode is dependent on several factors including the difference in pH between the anode electrolyte and the cathode electrolyte as can be determined by the Nerst equation, in some embodiments, the pH of the anode electrolyte is adjusted to a value between 0 and 7, including 0, 0.5, 1.0, 1.5, 2.0, 2.5, 3.0, 3.5, 4.0, 4.5, 5.0, 5.5, 6.0, 6.5 and 7, depending on the desired operating voltage across the anode and cathode. Thus, as can be appreciated, in equivalent systems, where it is desired to reduce the energy used and/or the voltage across the anode and cathode, e.g., as in the Chloralkali process, carbon dioxide can be added to the electrolyte as disclosed herein to achieve a desired pH difference between the anode electrolyte and cathode electrolyte. Thus, to the extent that such systems utilize carbon dioxide, these equivalent systems are within the scope of the present invention.

With reference to FIG. 1-17, in some embodiments, the anode electrolyte 102 comprises a salt solution that includes sodium ions and chloride ions; the system is configured to produce the alkaline solution in the cathode electrolyte 108 while also producing hydrogen ions at the anode 106, with less than 1V across the anode 122 and cathode 106, without producing a gas at the anode; the system is configured to migrate hydrogen ions from the anode into the anode electrolyte; the anode electrolyte comprises an acid; the system is configured to produce bicarbonate ions and/or carbonate ions in the cathode electrolyte 108; migrate hydroxide ions from the cathode 106 into the cathode electrolyte; migrate cations, e.g., sodium ions, from the anode electrolyte 104 into the cathode electrolyte through the first cation exchange membrane 116; hydrogen gas is provided to the anode; and a hydrogen gas delivery system 112 is configured to direct hydrogen gas from the cathode to the anode.

With reference to FIGS. 1-17, in some embodiments the cathode electrolyte 108 may be operatively connected to a system for further processing of the cathode electrolyte, e.g., a carbonate and/or bicarbonate precipitating system comprising a precipitator configured to precipitate carbonates and/or bicarbonates from a solution, wherein in some embodiments the carbonates and/or bicarbonates comprise calcium and/or magnesium carbonate and/or bicarbonate. Also, in some embodiments, the anode electrolyte 104 comprising an acid, e.g., hydrochloric acid, and a depleted salt solution comprising low amount sodium ions, is operatively connected to a system for further processing of an acid, e.g., a mineral dissolution system that is configured to dissolve minerals and produce a mineral solution comprising calcium ions and/or magnesium ions, e.g., mafic minerals such as olivine and serpentine. In some embodiments, the acid may used for other purposes in addition to or instead of mineral dissolution. Such use includes use as a reactant in production of cellulosic biofules, use the production of polyvinyl chloride (PVC), and the like. System appropriate to such uses may be operatively connected to the electrochemistry unit, or the acid may be transported to the appropriate site for use.

In the some embodiments, the mineral dissolution system is operatively connected to nano-filtration system that is configured to separate sodium ions and chloride ions from the mineral solution comprising, e.g., calcium ions, magnesium ions, silica, hydrochloric acid and/or sodium hydroxide. In some embodiments, the nano-filtration system 910 is configured with a reverse osmosis system that is capable of concentrating sodium ions and chloride ions into a salt solution that is used as the anode electrolyte 104.

With reference to FIGS. 1-17, the method in some embodiments comprises a step of adding carbon dioxide into a cathode electrolyte 108 in contact with a cathode 106 wherein the cathode electrolyte is separated from an anode electrolyte 104 by a first cation exchange membrane 116; and producing an alkaline solution in the cathode electrolyte by applying a voltage 114 of less that 1V across the cathode 106 and an anode 102 in contact with the anode electrolyte without producing a gas at the anode.

In some embodiments of the method, the anode 102 is in contact with a second cation exchange membrane 122 that separates the anode from the anode electrolyte; the alkaline solution 108 comprises hydroxide ions and/or bicarbonate ions and/or carbonate ions; the carbon dioxide 107 is contained in wastes gases of an industrial plant, e.g., an electrical power generating plant, a cement production plant, a fermentation process or an ore processing facility.

In some embodiments, ambient air is excluded the cathode electrolyte 108; a pH of between and 7 and 14 or greater is maintained in the cathode electrolyte; a pH of between 7 and 9 is maintained in the cathode electrolyte; a pH of between 8 and 11 is maintained in the cathode electrolyte; a pH of from less than 0 and up to 7 is maintained in the anode electrolyte; a pH of from less than 0 and up to 4 is maintained in the anode electrolyte; hydrogen gas is oxidized at the anode 102 to produce hydrogen ions and hydrogen ions are migrated from the anode through the second cation exchange membrane 122 into the anode electrolyte; hydroxide ions and hydrogen gas are produced at the cathode 106; hydroxide ions are migrated from the cathode 106 into the cathode electrolyte 108; hydrogen gas is directed from the cathode 106 to the anode 102; cations ions are migrated from the anode electrolyte 104 through the first cation exchange membrane 122 into the cathode electrolyte 108 wherein the cations comprise sodium ions.

In some embodiments, the method comprises producing sodium hydroxide and/or sodium carbonate ions and/or sodium bicarbonate ions in the cathode electrolyte 108; producing an acid and a depleted salt solution in the anode electrolyte 104 comprising sodium ions and chloride ions; utilizing the anode electrolyte to dissolve minerals and produce a mineral solution comprising calcium ions and/or magnesium ions, wherein the minerals comprises mafic minerals; filtering the mineral solution to produce a filtrate comprising sodium ions and chloride ions; concentrating the filtrate to produce the salt solution, wherein the concentrator comprises a reverse osmosis system; utilizing the salt solution as the anode electrolyte 104; precipitating a carbonate and/or bicarbonate with the cathode electrolyte; wherein the carbonate and/or bicarbonate comprises calcium and/or magnesium carbonate and/or bicarbonate. In some embodiments, the method includes disposing of the acid in an underground storage site where the acid can be stored in an un-reactive salt or rock formation without environmental acidification.

With reference to FIGS. 1-17, the method in another embodiment comprises a step of producing an acid 124 in an electrochemical system, e.g., system, comprising added carbon dioxide 106A, 107 in the cathode electrolyte 108; and contacting a mineral with the acid 124. In some embodiment the method further producing the acid in the anode electrolyte 104, without generating a gas at the anode 102, and oxidizing hydrogen gas 112 at the anode, wherein the acid comprises hydrochloric acid 124; and wherein the hydrogen gas 112 is produced at the cathode 106; producing an alkaline solution in the cathode electrolyte 108; migrating sodium ions into the cathode electrolyte; wherein the alkaline solution comprises sodium hydroxide, sodium bicarbonate and/or sodium carbonate; wherein the voltage is less than 2 V or less than 1V; wherein the anode electrolyte 104 is separated from the cathode electrolyte 108 by first cation exchange membrane 116; wherein the anode 102 comprises a second cation exchange membrane 122 in contact with the anode electrolyte 102; wherein the anode electrolyte comprises a salt, e.g., sodium chloride; dissolving a mineral with the acid 124 to produce a mineral solution; producing calcium ions and/or magnesium ions; wherein the mineral comprises a mafic mineral, e.g., olivine or serpentine; filtering the mineral solution to produce a filtrate comprising sodium ions and chloride ions solution; concentrating the filtrate to produce a salt solution; utilizing the salt solution as the anode electrolyte 104; precipitating a carbonate and/or bicarbonate with the cathode electrolyte; wherein the carbonate and/or bicarbonate comprises calcium and/or magnesium carbonate and/or bicarbonate. In some embodiments, the method includes disposing of the acid in an underground storage site where the acid can be stored in an un-reactive salt or rock formation and hence does not an environmental acidification.

With reference to FIGS. 1-17, the system and method in various embodiments are operable to produce an alkaline solution 108 and an acid 124 by a redox reaction that utilizes a salt solution 130 and water 902, wherein on applying a voltage, e.g., less than 3V across the anode and cathode, hydroxide ions and hydrogen gas are produce at the cathode, and hydrogen is oxidized at the anode without generating a gas at the anode. In some embodiments, carbon dioxide is added to the cathode electrolyte in contact with the cathode.

In some embodiments, the alkaline solution is produced in the cathode electrolyte and comprises hydroxide ions (from the cathode) and/or bicarbonate ions and/or carbonate ions from added carbon dioxide. In some embodiments, the hydrogen generated at the cathode is recovered and oxidized at the anode. In various embodiments, the redox reaction at the anode and cathode are catalyzed by electrocatalysts.

With reference to FIGS. 1-17, the system in one embodiment 900 comprises a hydrogen-oxidizing anode 102 in communication with a cathode electrolyte 108 comprising bicarbonate ions; and a hydrogen delivery system 112, configured to deliver hydrogen gas to the anode 102. In another embodiment, the system 900 comprises an electrochemical unit 100, 400, 700, 800, 900 comprising an anode compartment comprising a hydrogen-oxidizing anode 122, a cathode compartment comprising a cathode 106, and a hydrogen-delivery system 112 configured to deliver hydrogen gas to the anode, wherein the unit is operable connected a carbon sequestration system (not shown) configured to sequester carbon dioxide with the cathode electrolyte 108.

In some embodiments of the system, hydrogen gas to the anode is provided from hydrogen gas generated at a cathode in contact with the cathode electrolyte; the cathode electrolyte comprises added carbon dioxide; the cathode electrolyte comprises hydroxide ions and/or bicarbonate ions and/or carbonate ions; the bicarbonate ions and/or carbonate ions and/or hydroxide ions, hydrogen gas at the cathode, and the protons at the anode are produced by a voltage applied across the anode and cathode, without producing a gas at the anode; and the voltage is less than 3V.

In some embodiment of the system, and with reference to FIGS. 2, 10, 11 and 12, the anode 102 and/or cathode 106 may comprises an electrocatalyst 136 selected from platinum, a single-crystal nickel, Raney nickel, platinized nickel, a metal carbide ($W_2C$, Pt—$W_2C$), a platinum group metal alloy (Pt-M, where M=Fe, Mn, Cr, Co, Au), a transition metal, a nickel alloy, sintered nickel, a platinum group metals (Pt, Pd, Ru, Rh), gold, silver, a precious or non-precious chalcogenides, a discrete macrocyclic complex of transition metals and biological complexes. In various configurations, the electrocatalyst is provided on a solid electrode, or is provided on a mesh/gauze, a fiber, or as p[porous particles. In some embodiments, the electrocatalyst is configured to catalyzed oxidation of hydrogen gas to protons at the anode, and catalyze production of hydrogen gas and hydroxide ions at the cathode.

As noted above, in various embodiments, the present anode comprises electrocatalyst material that catalyzes the oxidation of hydrogen gas at the anode without allowing for formation of a gas, e.g., chlorine or oxygen from the electrolyte in contact with the anode. In various embodiments, suitable electrocatalyst material include: platinum, single-crystal nickel, Raney nickel, platinized nickel, metal carbides (including $W_2C$, Pt—$W_2C$), platinum group metal alloys (including Pt-M, where M=Fe, Mn, Cr, Co, Au and other elements), transition metals, nickel alloys and sintered nickel, platinum group metals (including Pt, Pd, Ru, Rh and mono, bi and ternary combinations), gold, and silver, precious and non-precious chalcogenides, discrete macrocyclic complexes of transition metals and biological complexes. Optionally, these materials can also be used as electrocatalysts at the cathode.

In various embodiments, rather that forming the anode entirely of the electrocatalysts material, a relatively small amount of the electrocatalyst material is used. Thus as is illustrated in illustrated in FIG. 12, a small amount of electrocatalyst (C) is placed on a support structure (B) that is attached to the surface of a conventional conductive material (A). The electrocatalyst material can be placed on the substrate by a conventional methods including: high temperature deposition, in situ deposition by free surfactant, colloidal deposition, vacuum deposition (sputtering), screen printing, brushing, electro-deposition, ink jet printing, plasma treatment, non-aqueous synthesis, aqueous synthesis gas solid state reaction, sulfur ion-free synthesis, wet impregnation, hydrothermal and/or solvotherma methods.

Figure 12:
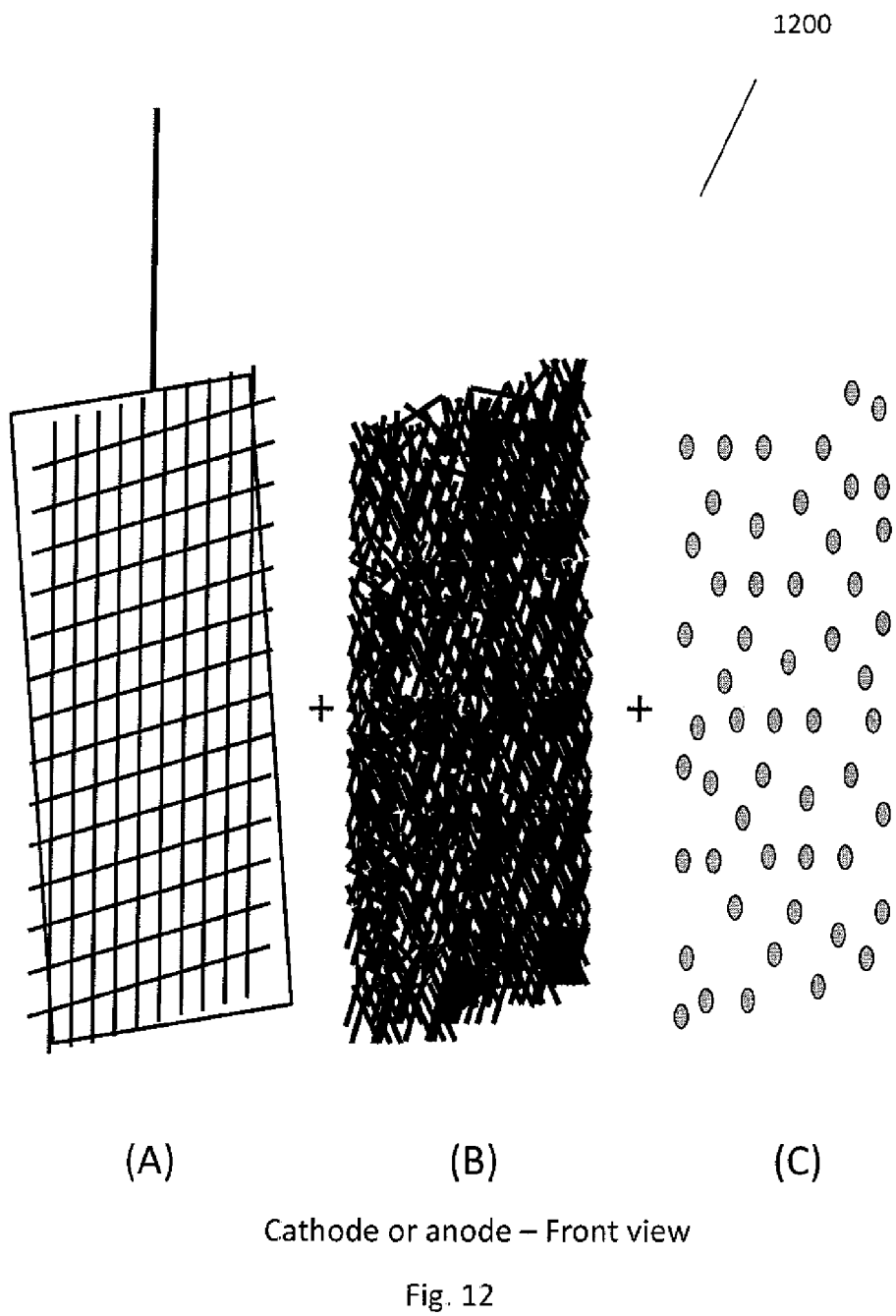
FIG. 12 is an illustration of an embodiment of the electrodes.

With reference to FIG. 12, suitable conductive material (A) that can be used to form the anode includes any electrically conductive metals, carbonaceous materials, valve metals such as titanium, tantalum, niobium, and zirconium and semiconductor materials. Suitable catalyst support include: pates, carbon fibers, porous gas diffusion, electrodes, carbon fiber paper, carbon fabric, carbon nanowebbing and nano support materials and syntheses. Suitable support structure material (B) includes: single-walled carbon nanotubes, multi-walled carbon nanotubes, fullerite, torus, nanobuds, silica, alumina, tungsten carbide (WC) and the like. The nano material can be formed by conventional methods including arc discharge, chemical vapor deposition, laser ablation, natural, incidental, and controlled flame environments.

Figure 10:
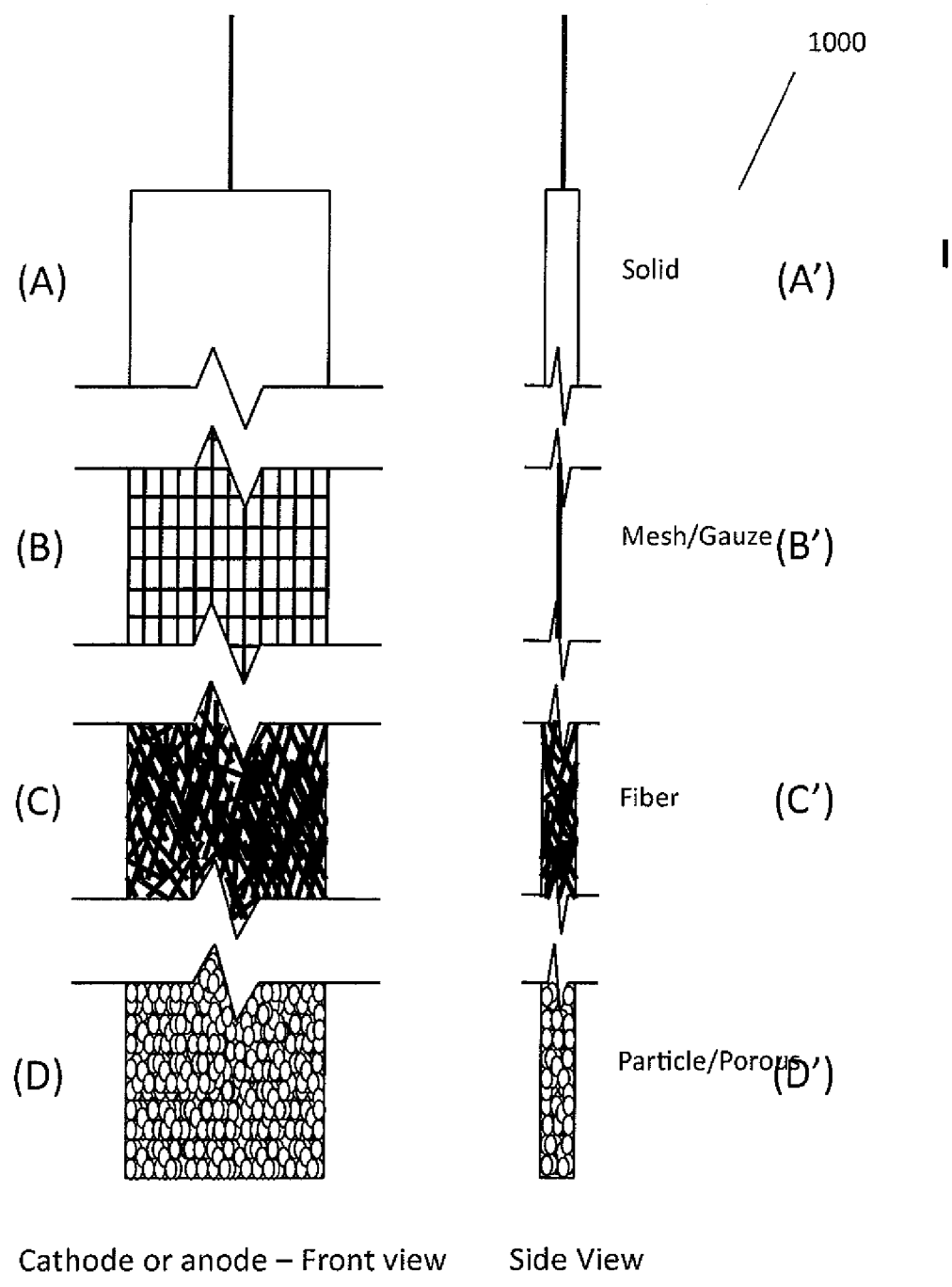
FIG. 10 is an illustration of an embodiment of the electrodes.
Figure 11:
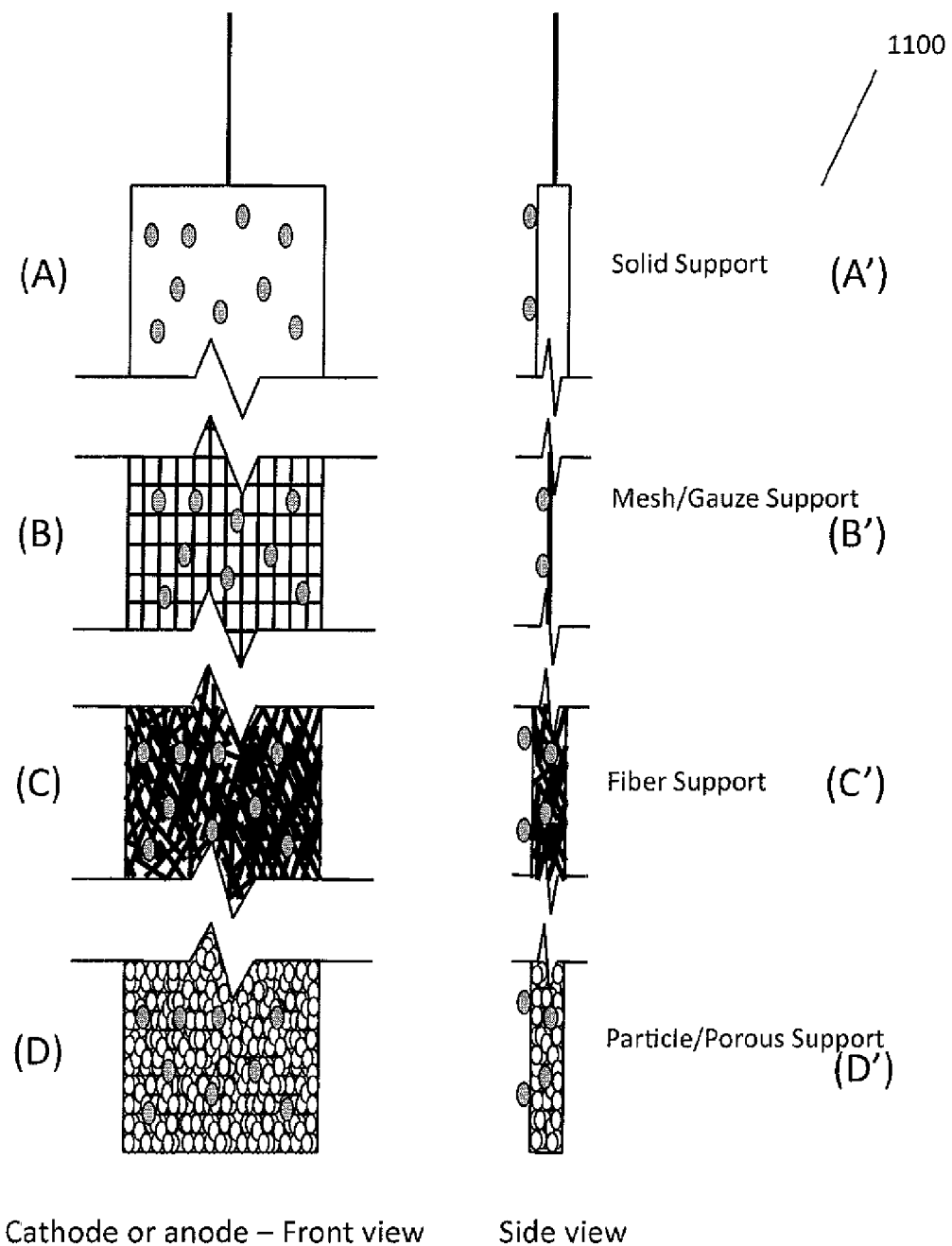
FIG. 11 is an illustration of an embodiment of the electrodes.

As is illustrated in FIGS. 10-12, in various embodiments, the anode can be configured into several structures and shapes for use in the present system. For example, as is illustrated in FIG. 10, the anode can comprise a solid structure (A), a mesh/gauze structure (B), a structure comprised of a fibrous material (C), or a porous structure (D). Similarly, the electrode can be configured in at an angle to increase hydrogen adsorption residence time in the cell, or placed horizontally or vertically in the cell, and/or fanned and pleated and/or rolled into tubular from for use in the cell. In various embodiments, once the current collector and/or support structure is formed, the electrocatalyst material can be attached to the anode current collector material and/or the support structure material in several ways as is illustrated in FIG. 11-12, e.g., directly on the current collector as in FIGS. 11A, 11B and 11C; or within a porous support structure as in FIG. 11D.

In some embodiments, the system comprises a carbon sequestration system (not shown) configured to sequester carbon dioxide with the cathode electrolyte; in some embodiments, the carbon dioxide is contained in an industrial waste gas; in some embodiments, the carbon dioxide is sequestered as carbonates and/or bicarbonates comprising divalent cations e.g., calcium ions and/or magnesium ions.

In some embodiments, the system comprises an acid 124 in the anode electrolyte 104; in some embodiments, the system comprises an acid dissolution system configured to produce divalent cations e.g., calcium ions and magnesium ions with the acid; in some system the divalent cations are produced by dissolving a mineral with the acid, and the divalent cations are provided to the carbon sequestration system.

Figure 13:
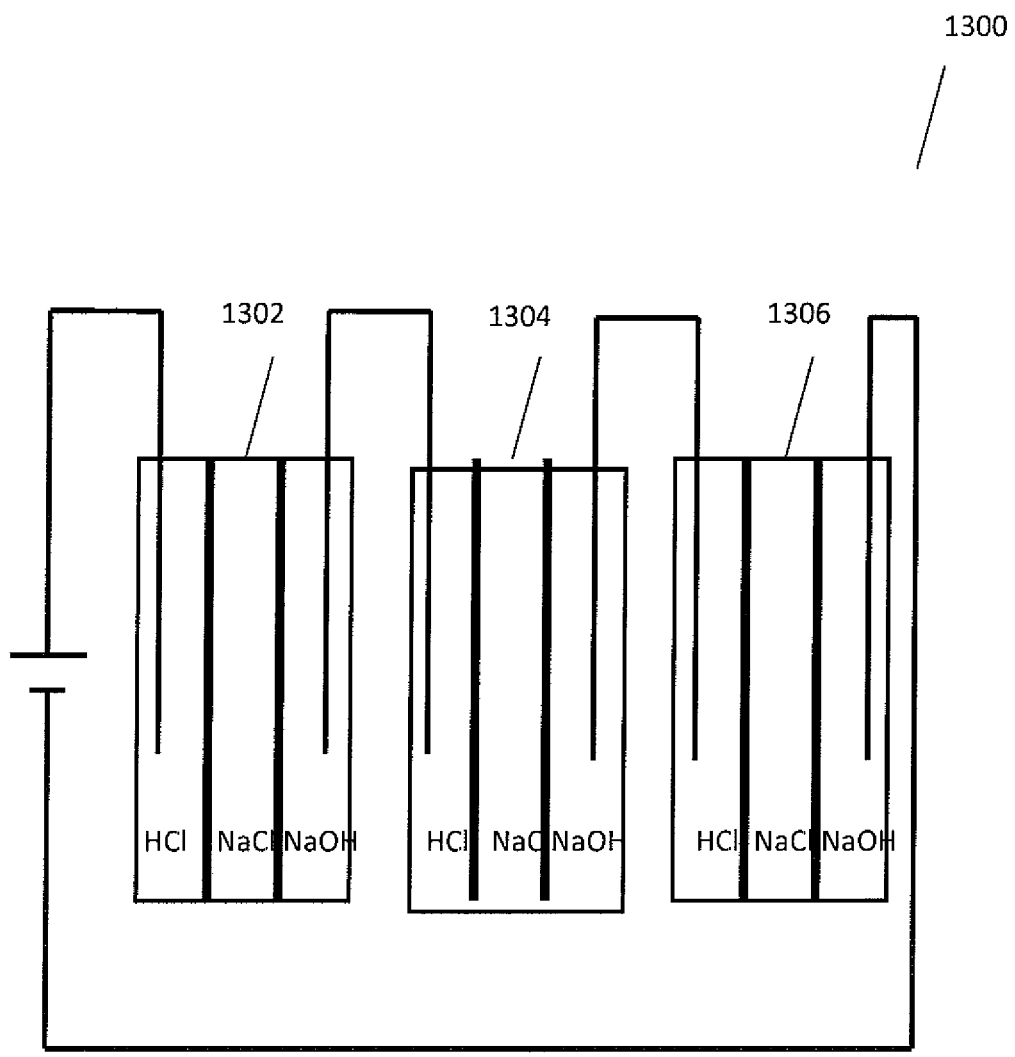
FIG. 13 is an illustration of an embodiment of the cell configuration.

With reference FIG. 13, in some embodiments, the system comprises a plurality of pairs of the anodes and cathodes 1302, 1304, 1306 configured to receive a series current through each pair of anode and cathode. In another embodiment, an with reference to FIG. 14, the system comprises plurality of pairs of anodes and cathodes 1402, 1404, 1406 configured to receive a parallel voltage across each pair of anode and cathode. With reference to FIG. 15, in another embodiment, the system comprises a plurality of pairs of the anode electrolyte and cathode electrolyte wherein the cathode electrolyte of a first pair 1502 is connected to the cathode electrolyte of a second pair 1504; and the anode electrolyte of a first pair 1502 is connected to the anode electrolyte of a second pair 1502.

In some embodiments of the system 1500 as illustrated in FIG. 15, the pH of the anode electrolyte and cathode electrolyte can be adjusted to optimize the energy used in producing the alkaline solution. Thus, for example, the pH of the cathode electrolyte 1504 of the second pair (pH=11) can be adjusted such that it is equal to or greater than the pH of the cathode electrolyte 1502 in the first pair (pH=9); similarly, the pH of the anode electrolyte 1504 of the second pair (pH=3) can be adjusted to be equal to or less than the pH of the anode electrolyte 1502 of the first pair (pH=5). As can be appreciated, these pH adjustments are exemplary and thus other pH configurations can be established, e.g., adjusting the flow of fluids in the system, e.g., adding carbon dioxide to the cathode electrolyte and/or adding water to the electrolyte, and/or removing acid and alkaline solution from the system.

Figure 15:
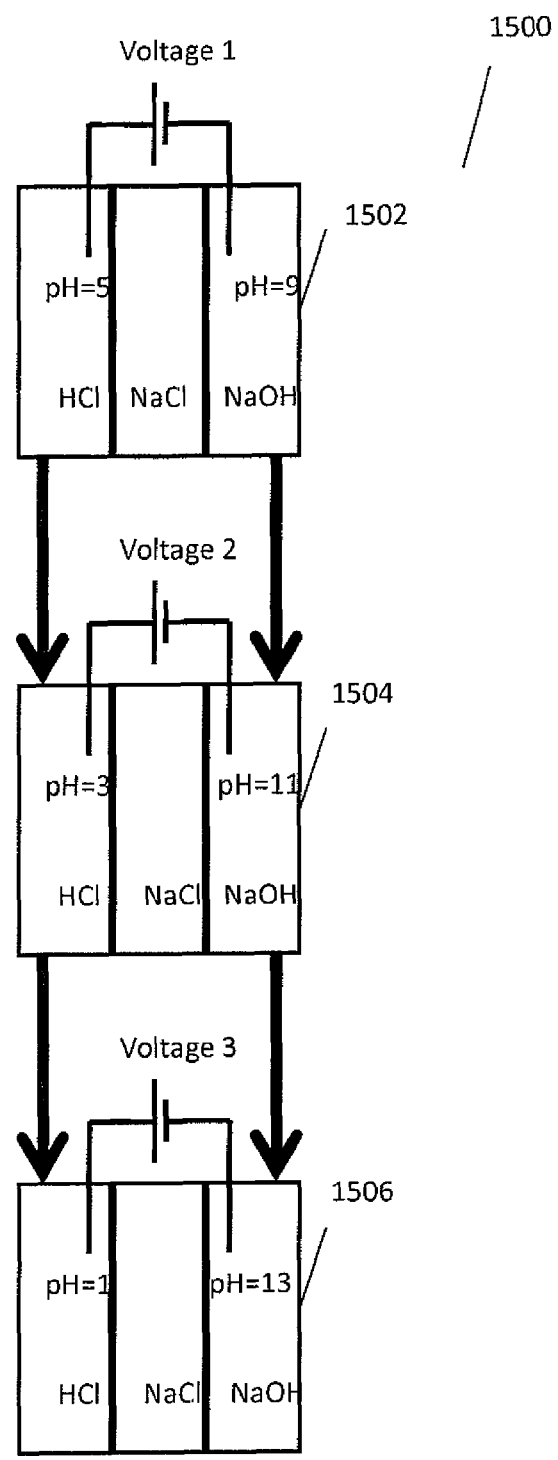
FIG. 15 is an illustration of an embodiment of the cell configuration.
Figure 16:
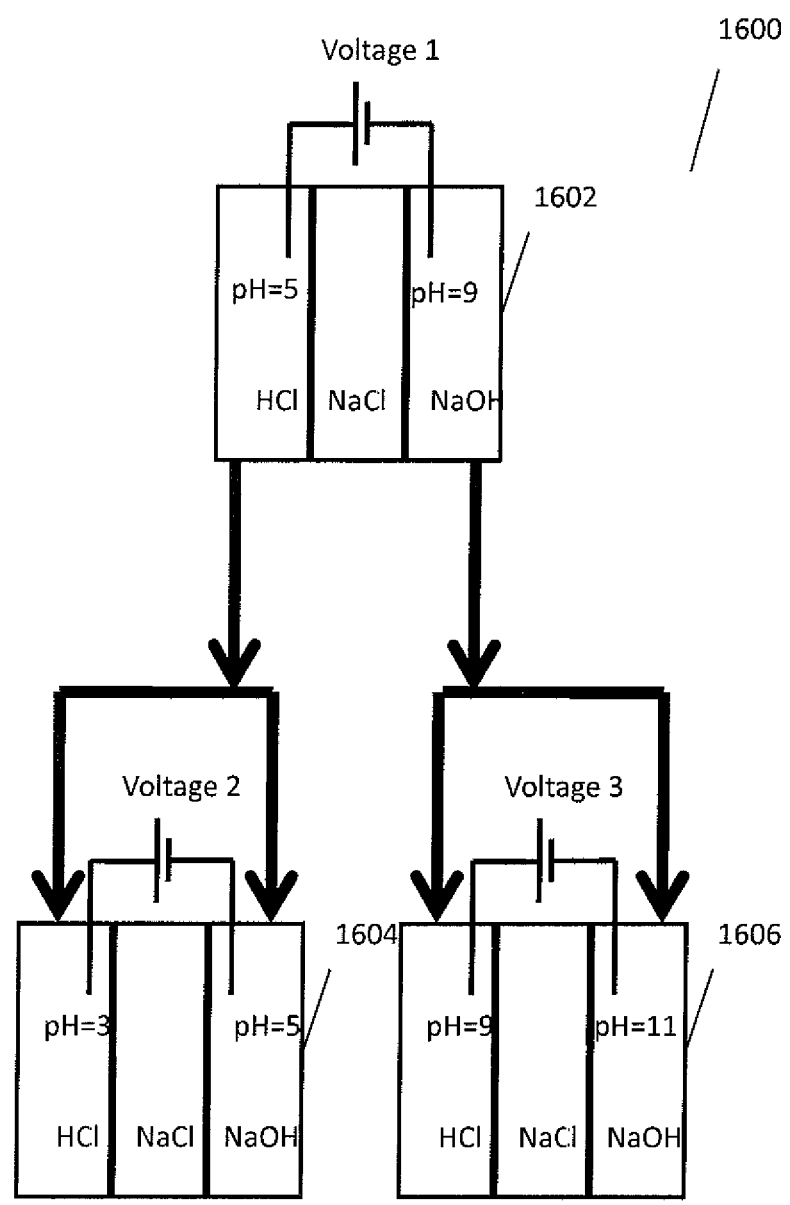
FIG. 16 is an illustration of an embodiment of the cell configuration.

In some embodiments of the system as illustrated in FIG. 16, the system 1600 comprises a plurality of pairs of the anode electrolytes and cathode electrolytes 1602, 1604, 1606 wherein the cathode electrolyte and anode electrolyte of a second pair 1606 comprise cathode electrolyte from a first pair 1602; and the cathode electrolyte and anode electrolyte of a third pair 1604 comprise anode electrolyte from the first pair 1602 such that in the system the pH of the cathode electrolyte of the second pair is equal to or greater than pH of the cathode electrolyte of the first pair; and the pH of the anode electrolyte of the third pair is equal to or less that pH of the anode electrolyte of the first pair. As with the system of FIG. 15, these pH adjustments are exemplary and thus other pH configurations can be established, e.g., adjusting the flow of fluids in the system, e.g., adding carbon dioxide to the cathode electrolyte and/or adding water to the electrolyte, and/or removing acid and alkaline solution from the system.

Figure 17:
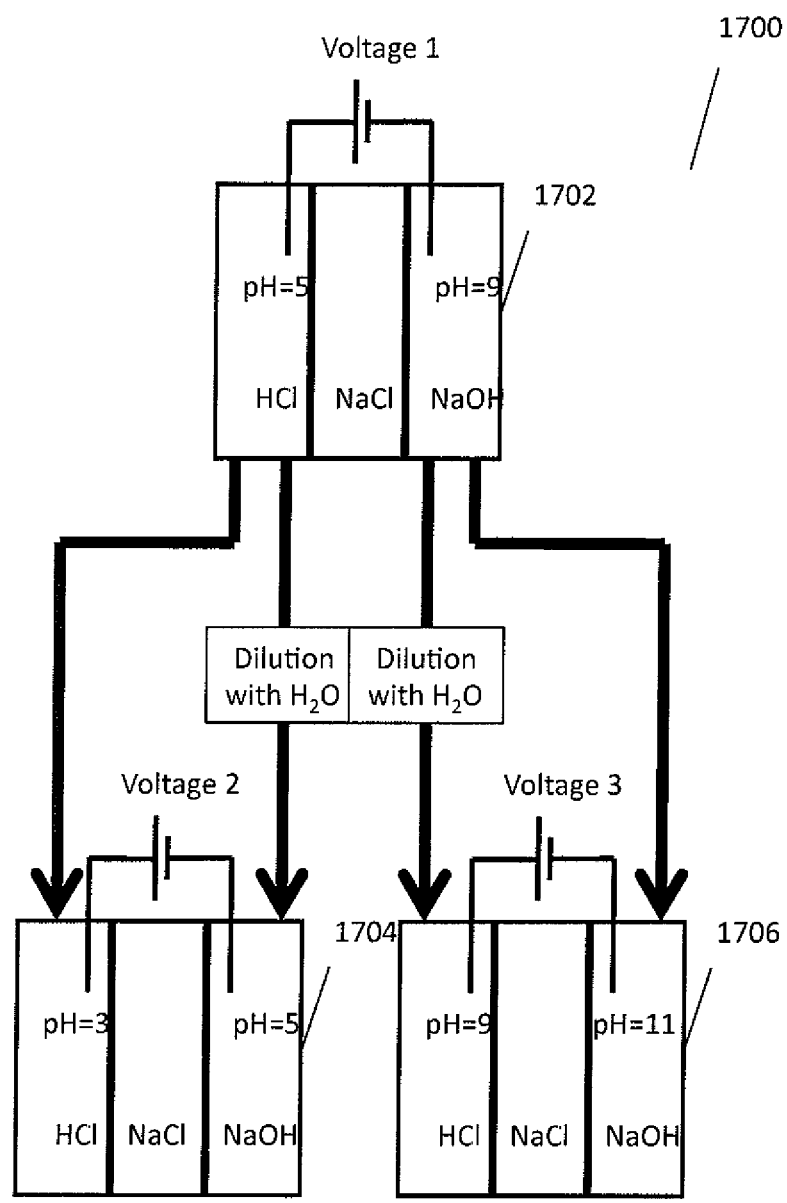
FIG. 17 is an illustration of an embodiment of the cell configuration.

With reference to the system 1700 as illustrated in FIG. 17, the system is configured such that in some embodiments the cathode electrolyte of the second pair of anodes and cathodes 1706 comprises diluted cathode electrolyte of the first pair 1702; and the anode electrolyte of the third pair 1704 comprises diluted anode electrolyte of the first pair 1702. As with the system of FIGS. 15 and 16, these pH adjustments are exemplary and thus other pH configurations can be established, e.g., adjusting the flow of fluids in the system, e.g., adding carbon dioxide to the cathode electrolyte and/or adding water to the electrolyte, and/or removing acid and alkaline solution from the system.

With reference to FIGS. 1-17, the method in various embodiments comprises a step of oxidizing hydrogen gas to protons at an anode 102 without producing a gas at the anode 102; and producing bicarbonate ions in a cathode electrolyte 108 in communication with the anode 102. In another embodiment, the method comprises a step of oxidizing hydrogen gas at a hydrogen-oxidizing anode 102 in communication with a cathode electrolyte 108; and sequestering carbon dioxide with the cathode electrolyte 108.

In some embodiments, the method comprises applying a voltage across the anode and a cathode in contact with the cathode electrolyte, e.g. a voltage of less than 3V, and producing hydrogen gas at the cathode. In some embodiments, the method comprises configuring a hydrogen delivery system to provide the hydrogen gas to the anode from hydrogen gas produced at the cathode, and adding carbon dioxide to the cathode electrolyte. In some embodiments, the method comprises comprising producing hydroxide ions and/or carbonate ions and/or bicarbonate ions in the cathode electrolyte.

In some embodiments of the method, the anode and/or cathode comprises an electrocatalyst selected from platinum, a single-crystal nickel, Raney nickel, platinized nickel, a metal carbide ($W_2C$, Pt—$W_2C$), a platinum group metal alloy (Pt-M, where M=Fe, Mn, Cr, Co, Au), a transition metal, a nickel alloy, sintered nickel, a platinum group metals (Pt, Pd, Ru, Rh), gold, silver, a precious or non-precious chalcogenides, a discrete macrocyclic complex of transition metals and biological complexes. In some embodiments, the electrocatalyst is configured to catalyze the oxidation of hydrogen gas to protons at the anode, and catalyze production of hydrogen gas and hydroxide ions at the cathode.

In some embodiments, the method comprises sequestering carbon dioxide with the cathode electrolyte, wherein the carbon dioxide is contained in an industrial waste gas, and wherein the carbon dioxide is sequestered as carbonates and/or bicarbonates, e.g., as carbonates and/or bicarbonates comprising divalent cations such as calcium ions and/or magnesium ions.

In some embodiments, the method comprises producing an acid in the anode electrolyte, and configuring an acid dissolution system to produce divalent cations with the acid, e.g., produce calcium ions and/or magnesium ions by dissolving a mineral with the acid. In some embodiments, the acid dissolution system is configured to provide divalent cations to the carbon sequestration system.

In some embodiments of the method, and with reference to the system 1300 of FIG. 13, the method comprises configuring a plurality of pairs of the anodes and cathodes 1302, 1304, 1306 in series to receive a common current through each pair of anode and cathode.

Figure 14:
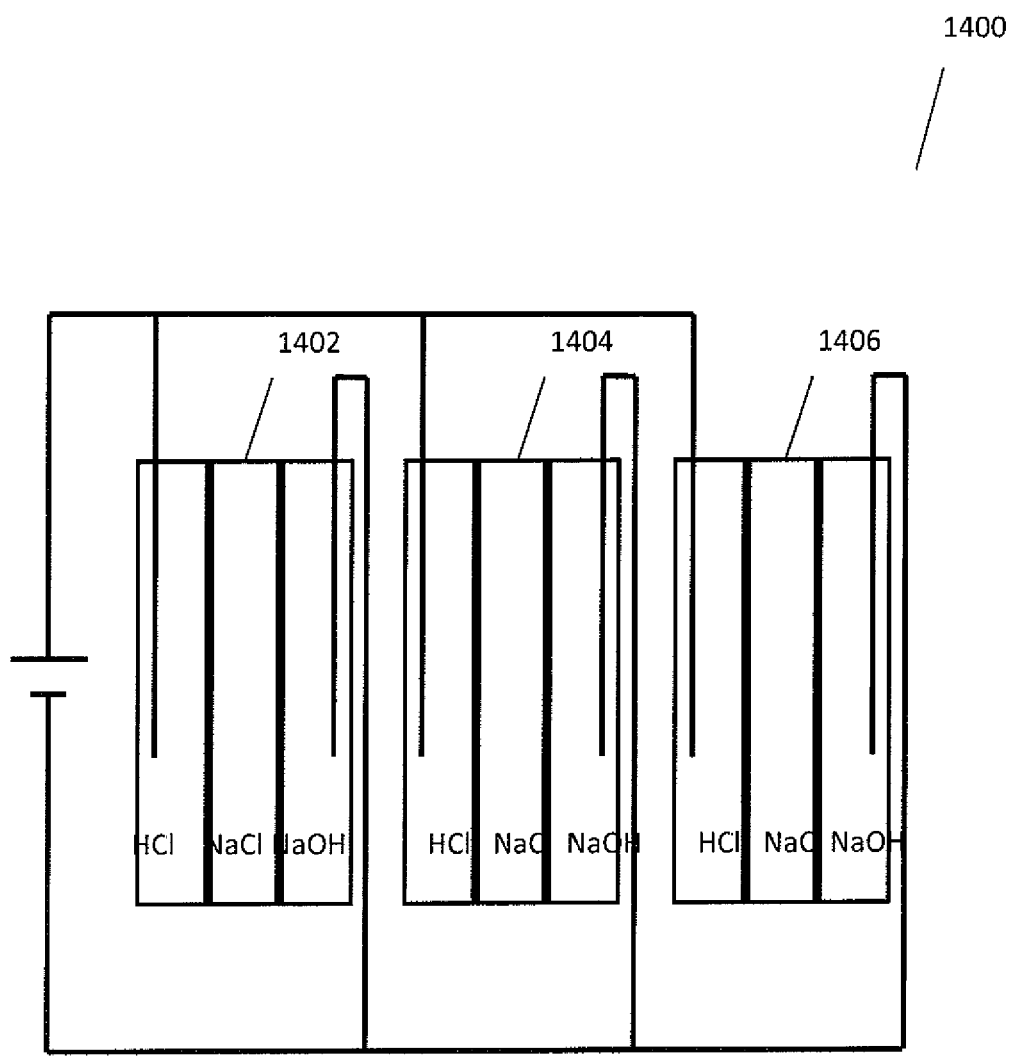
FIG. 14 is an illustration of an embodiment of the cell configuration.

In some embodiments is illustrated in the system of FIG. 14, the method comprises configuring a plurality of pairs of anodes and cathodes 1402, 1404, 1406 in parallel to receive a common voltage 114 across each pair of anode and cathode.

In some embodiments of the method, and with reference to the system 1500 of FIG. 15, the method comprises configuring a plurality of pairs of the anode electrolyte and cathode electrolyte whereby the cathode electrolyte of a first pair 1502 is connected to the cathode electrolyte of a second pair 1504; and the anode electrolyte of a first pair 1502 is connected to the anode electrolyte of a second pair 1504, and adjusting the pH of the cathode electrolyte of the second pair 1504 to a value equal to or greater than the pH of the cathode electrolyte in the first pair 1502; and adjusting the pH of the anode electrolyte of the second pair 1504 to a value equal to or less than the pH of the anode electrolyte of the first pair 1502. As can be appreciated, these pH adjustments are exemplary and thus other pH configurations can be established, e.g., adjusting the flow of fluids in the system, e.g., adding carbon dioxide to the cathode electrolyte and/or adding water to the electrolyte, and/or removing acid and alkaline solution from the system.

In some embodiments of the method and with reference to the FIG. 16, the method comprises configuring a plurality of pairs of the anode electrolyte and cathode electrolyte whereby the cathode electrolyte and anode electrolyte of a second pair 1606 comprise cathode electrolyte from a first pair 1602; and the cathode electrolyte and anode electrolyte of a third pair 1604 comprise anode electrolyte from the first pair 1602. As can be appreciated, these pH adjustments are exemplary and thus other pH configurations can be established, e.g., adjusting the flow of fluids in the system, e.g., adding carbon dioxide to the cathode electrolyte and/or adding water to the electrolyte, and/or removing acid and alkaline solution from the system.

In another embodiment, and with reference to FIG. 17, the method comprises adjusting the pH of the cathode electrolyte of the second pair 1706 to a value equal to or greater than pH of the cathode electrolyte of the first pair 1702; and adjusting the pH of the anode electrolyte of the third pair 1704 to a value equal to or less that pH of the anode electrolyte of the first pair 1702. As can be appreciated, these pH adjustments are exemplary and thus other pH configurations can be established, e.g., adjusting the flow of fluids in the system, e.g., adding carbon dioxide to the cathode electrolyte and/or adding water to the electrolyte, and/or removing acid and alkaline solution from the system.

In an exemplary embodiment, a system configured substantially as illustrated in FIGS. 1-17 was operated with a constant current density applied across the electrodes at steady state conditions while carbon dioxide gas was continuously dissolved into the cathode electrolyte, at various temperatures and voltages. In the system, a platinum catalyst, gas diffusion anode obtained from E-TEK Corporation, (USA) was used as the anode. A Raney nickel deposited onto a nickel gauze substrate was used as the cathode. In the system, the initial acid concentration in the anode electrolyte was 1 M; the initial sodium chloride salt solution was 5 M; and the initial concentration of the sodium hydroxide solution in the cathode compartment was 1 M. In the system, the pH of the cathode compartment was maintained at either 8 or 10 by regulating the amount of carbon dioxide dissolved in the cathode electrolyte.

TABLE 1

Experimental Current Density, Temperature and Voltage Characteristics of the System

| T (° C.) | Potential (V) | pH | Current density (mA/cm$^2$) |
|---|---|---|---|
| 25 | 0.8 | 10 | 8.6 |
|  |  | 8 | 11.2 |
|  | 1.2 | 10 | 28.3 |
|  |  | 8 | 29.2 |
|  | 1.6 | 10 | 50.2 |
|  |  | 8 | 50.6 |
| 75 | 0.8 | 10 | 13.3 |
|  |  | 8 | 17.8 |
|  | 1.2 | 10 | 45.3 |
|  |  | 8 | 49.8 |
|  | 1.6 | 10 | 80.8 |
|  |  | 8 | 84.7 |

As is illustrated in Table 1, a range of current densities was achieved across the electrode in the system. As can be appreciated, the current density that can be achieved with other configurations of the system may vary, depending on several factors including the cumulative electrical resistance losses in the cell, environmental test conditions, the over-potential associated with the anodic and cathodic reactions, and other factors.

The current densities achieved in the present configuration and as set forth in Table 1 are correlated with the production of hydroxide ions at the cathode, and thus correlates with the production of sodium hydroxide and/or sodium carbonate and/or sodium bicarbonate in the cathode electrolyte, as follows. With reference to Table 1, at 75° C., 0.8 V and a pH of 10, each cm$^2$ of electrode passed 13.3 mA of current, where current is a measure of charge passed (Coulomb) per time (second). Based on Faraday's Laws, the amount of product, e.g., hydroxide ions, produced at an electrode is proportional to the total electrical charge passed through the electrode as follows:

$$n=(I*t)/(F*z)$$

where n is moles of product, I is a current, t is time, F is Faraday's constant, and z is the electrons transferred per product ionic species (or reagent ionic species). Thus, based on the present example, $1.38 \times 10^{-4}$ moles of hydroxide ions are produced per second per cm$^2$ of electrode, which is correlated with the production of sodium hydroxide in the cathode electrolyte. In the system the production rate of NaOH dictates the production rate of NaHCO$_3$ and Na$_2$CO$_3$ through Le Chatelier's principle following the net chemical equilibria equations of

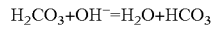

and 

where an increase in concentration of one species in equilibria will change the concentration of all species so that the equilibrium product maintains the equilibrium constant. Thus, in the system, the equilibrium concentrations of H$_2$CO$_3$, HCO$_3^-$, and CO$_3^{2-}$ vs. pH in the electrolyte will follow the carbonate speciation diagram as discussed above.

In the system as illustrated in FIGS. 1-9 and as discussed with reference to the carbonate speciation graph, supra, the solubility of carbon dioxide in the cathode electrolyte is dependent on the pH of the electrolyte. Also in the system, the voltage across the cathode and anode is dependent on several factors including the pH difference between the anode electrolyte and cathode electrolyte. Thus, in some embodiments the system can be configured to operate at a specified pH and voltage to absorb carbon dioxide and produce carbonic acid, carbonate ions and/or bicarbonate ions in the cathode electrolyte. In embodiments where carbon dioxide gas is dissolved in the cathode electrolyte, as protons are removed from the cathode electrolyte more carbon dioxide may be dissolved to form carbonic acid, bicarbonate ions and/or carbonate ions.

Depending on the pH of the cathode electrolyte the balance is shifted toward bicarbonate ions or toward carbonate ions, as is well understood in the art and as is illustrated in the carbonate speciation diagram, above. In these embodiments the pH of the cathode electrolyte solution may decrease, remain the same, or increase, depending on the rate of removal of protons compared to rate of introduction of carbon dioxide. It will be appreciated that no carbonic acid, hydroxide ions, carbonate ions or bicarbonate ions are formed in these embodiments, or that carbonic acid, hydroxide ions, carbonate ions, bicarbonate ions may not form during one period but form during another period.

In another embodiment, the system and method are integrated with a carbonate and/or bicarbonate precipitation system (not illustrated) wherein a solution of divalent cations, when added to the present cathode electrolyte, causes formation of precipitates of divalent carbonate and/or bicarbonate compounds, e.g., calcium carbonate or magnesium carbonate and/or their bicarbonates. In some embodiments, the precipitated divalent carbonate and/or bicarbonate compounds may be utilized as building materials, e.g., cements and aggregates as described for example in commonly assigned U.S. patent application Ser. No. 12/126,776 filed on May 23, 2008, herein incorporated by reference in its entirety.

In an alternative embodiment, the system and method are integrated with a mineral and/or material dissolution and recovery system (not illustrated) wherein the acidic anode electrolyte solution 104 or the basic cathode electrolyte 108 is utilized to dissolve calcium and/or magnesium-rich minerals e.g., serpentine or olivine, or waste materials, e.g., fly ash, red mud and the like, to form divalent cation solutions that may be utilized, e.g., to precipitate carbonates and/or bicarbonates as described herein. In some embodiments, the precipitated divalent carbonate and/or bicarbonate compounds may be utilized as building materials, e.g., cements and aggregates as described for example in commonly assigned U.S. patent application Ser. No. 12/126,776 filed on May 23, 2008, herein incorporated by reference in its entirety.

In an alternative embodiment, the system and method are integrated with an industrial waste gas treatment system (not illustrated) for sequestering carbon dioxide and other constituents of industrial waste gases, e.g., sulfur gases, nitrogen oxide gases, metal and particulates, wherein by contacting the flue gas with a solution comprising divalent cations and the present cathode electrolyte comprising hydroxide, bicarbonate and/or carbonate ions, divalent cation carbonates and/or bicarbonates are precipitated as described in commonly assigned U.S. patent application Ser. No. 12/344,019 filed on Dec. 24, 2008, herein incorporated by reference in its entirety. The precipitates, comprising, e.g., calcium and/or magnesium carbonates and bicarbonates in some embodiments may be utilized as building materials, e.g., as cements and aggregates, as described in commonly assigned U.S. patent application Ser. No. 12/126,776 filed on May 23, 2008, herein incorporated by reference in its entirety.

In another embodiment, the system and method are integrated with an aqueous desalination system (not illustrated) wherein the partially desalinated water of the third electrolyte of the present system is used as feed-water for the desalination system, as described in commonly assigned U.S. patent application Ser. No. 12/163,205 filed on Jun. 27, 2008, herein incorporated by reference in its entirety.

In an alternative embodiment, the system and method are integrated with a carbonate and/or bicarbonate solution disposal system (not illustrated) wherein, rather than producing precipitates by contacting a solution of divalent cations with the first electrolyte solution to form precipitates, the system produces a solution, slurry or suspension comprising carbonates and/or bicarbonates. In some embodiments, the solution, slurry or suspension is disposed of in a location where it is held stable for an extended periods of time, e.g., the solution/slurry/suspension is disposed in an ocean at a depth where the temperature and pressure are sufficient to keep the slurry stable indefinitely, as described in U.S. patent application Ser. No. 12/344,019 filed on Dec. 24, 2008, herein incorporated by reference in its entirety; or in a subterranean site.

The invention claimed is:

1. A system comprising:
a hydrogen-oxidizing anode comprising a solid support, a mesh/guage support between the solid support and fiber support wherein the solid support and the mesh/guage support comprise electrically conductive metal, fiber support wherein the fiber support comprises carbon fiber, carbon fiber paper, carbon fabric, carbon nanowebbing, carbon nanotube, or combinations thereof and electrocatalyst particles wherein the electrocatalyst particles are provided on the solid support, the mesh/guage support, the fiber support, or combinations thereof, wherein the hydrogen-oxidizing anode is in communication with an anode electrolyte, and wherein the electrocatalyst is configured to catalyze oxidation of hydrogen gas to form hydrogen ions without forming a gas.

2. The system of claim 1, further comprising a cathode in communication with a cathode electrolyte wherein the cathode is configured to form hydroxide ions and hydrogen gas.

3. The system of claim 2, wherein the cathode electrolyte comprises added carbon dioxide.

4. The system of claim 2, further comprising a carbon sequestration system configured to receive the cathode electrolyte and sequester carbon dioxide with the cathode electrolyte.

5. The system of claim 4, wherein carbon dioxide is contained in an industrial waste gas.

6. The system of claim 5, wherein the carbon dioxide is sequestered as carbonates and/or bicarbonates comprising calcium ions and/or magnesium ions.

7. The system of claim 1, wherein the electrocatalyst is selected from platinum, single-crystal nickel, Raney nickel, platinized nickel, metal carbide, platinum group metal alloy, transition metal, nickel alloy, sintered nickel, platinum group metal, gold, silver, precious or non-precious chalcogenides, discrete macrocyclic complex of transition metals, biological complexes and combinations thereof.

8. The system of claim 1, comprising an acid in the anode electrolyte.

9. The system of claim 8, further comprising an acid dissolution system configured to receive the anode electrolyte and wherein the anode electrolyte is configured to dissolve mineral and produce divalent cations comprising calcium ions or magnesium ions.

10. The system of claim 8, wherein the acid dissolution system is configured to provide divalent cations to a carbon sequestration system.

11. The system of claim 1, wherein a portion of the anode that interfaces with the hydrogen gas is hydrophobic and a portion of the anode that interfaces with the anode electrolyte is hydrophilic.

12. The system of claim 1, wherein the electrically conductive metal comprises titanium, tantalum, niobium, zirconium or semiconductor material.

13. A system comprising:
an electrochemical unit comprising an anode compartment comprising a hydrogen-oxidizing anode comprising a solid support, a mesh/guage support between the solid support and fiber support wherein the solid support and the mesh/guage support comprise electrically conductive metal, fiber support wherein the fiber support comprises carbon fiber, carbon fiber paper, carbon fabric, carbon nanowebbing, carbon nanotube, or combinations thereof and electrocatalyst particles wherein the electrocatalyst particles are provided on the solid support, the mesh/guage support, the fiber support, or combination thereof, and a cathode compartment comprising a cathode in a cathode electrolyte, wherein the hydrogen-oxidizing anode is in communication with an anode electrolyte, and wherein the electrocatalyst is configured to catalyze oxidation of hydrogen gas to form hydrogen ions without forming a gas, a hydrogen gas delivery system configured to deliver hydrogen gas to the anode, and a carbon sequestration system operably connected to the electrochemical unit and configured to sequester carbon dioxide with the cathode electrolyte.

14. The system of claim 13, wherein the hydrogen gas delivery system is configured to provide hydrogen gas from the cathode to the anode.

15. The system of claim 13, wherein the cathode electrolyte comprises hydroxide ions and/or bicarbonate ions and/or carbonate ions.

16. The system of claim 13, wherein the cathode electrolyte further comprises added carbon dioxide.

17. The system of claim 16, wherein the electrochemical unit is configured to produce bicarbonate ions, carbonate ions, and/or hydroxide ions and hydrogen gas at the cathode, and the protons at the anode by a voltage applied across the anode and cathode, without producing a gas at the anode.

18. The system of claim 13, wherein electrocatalyst is selected from platinum, single-crystal nickel, Raney nickel, platinized nickel, metal carbide, platinum group metal alloy, transition metal, nickel alloy, sintered nickel, platinum group metals, gold, silver, precious or non-precious chalcogenides, discrete macrocyclic complex of transition metals, biological complexes, and combinations thereof and wherein the electrocatalyst is configured to catalyze oxidation of hydrogen gas to protons at the anode.

19. The system of claim 13, wherein the carbon dioxide is sequestered as magnesium and/or calcium carbonates and/or bicarbonates.

20. The system of claim 13, comprising an acid in the anode electrolyte and an acid dissolution system configured to dissolve mineral with the acid and produce divalent cations comprising calcium ions and/or magnesium ions.

21. The system of claim 20, wherein the acid dissolution system is configured to provide divalent cations to a carbon sequestration system.

22. The system of claim 13, wherein a portion of the anode that interfaces with the hydrogen gas is hydrophobic and a portion of the anode that interfaces with the anode electrolyte is hydrophilic.

23. The system of claim 13, wherein the electrically conductive metal comprises titanium, tantalum, niobium, zirconium or semiconductor material.

* * * * *